(12) United States Patent
Kanteti et al.

(10) Patent No.: US 12,126,687 B2
(45) Date of Patent: Oct. 22, 2024

(54) SYSTEMS AND METHODS FOR ENHANCED WIRELESS COMMUNICATIONS BETWEEN ANALYTE SENSOR SYSTEMS AND DISPLAY DEVICES

(71) Applicant: Dexcom, Inc., San Diego, CA (US)

(72) Inventors: Satish Kumar Kanteti, San Diego, CA (US); Jefferson Hu, San Diego, CA (US); Ismael V. Jimenez, San Diego, CA (US)

(73) Assignee: Dexcom Inc., San Diego, CA (US)

( * ) Notice: Subject to any disclaimer, the term of this patent is extended or adjusted under 35 U.S.C. 154(b) by 0 days.

(21) Appl. No.: 18/350,744

(22) Filed: Jul. 11, 2023

(65) Prior Publication Data

US 2024/0022636 A1 Jan. 18, 2024

Related U.S. Application Data

(60) Provisional application No. 63/368,631, filed on Jul. 15, 2022.

(51) Int. Cl.
*G06F 15/16* (2006.01)
*H04L 67/12* (2022.01)
*H04L 67/141* (2022.01)

(52) U.S. Cl.
CPC ............ *H04L 67/141* (2013.01); *H04L 67/12* (2013.01)

(58) Field of Classification Search
CPC .............................. H04L 67/12; H04L 67/141
USPC ....................................................... 709/228
See application file for complete search history.

(56) References Cited

U.S. PATENT DOCUMENTS

| 6,085,249 | A  | * | 7/2000  | Wang ............... H04N 21/23439 |
|           |    |   |         | 709/227 |
| 9,654,962 | B2 | * | 5/2017  | Woodward ............. H04W 8/02 |
| 9,998,494 | B2 | * | 6/2018  | Nairn .................... H04L 63/126 |
| 10,127,360 | B2 | * | 11/2018 | Chack .................... H04W 4/80 |
| 10,127,366 | B2 | * | 11/2018 | Kohli ..................... G06F 21/35 |
| 10,366,250 | B1 | * | 7/2019  | Chen .................. G06F 21/6245 |
| 10,759,389 | B2 | * | 9/2020  | Ledvina ................ H04W 4/023 |
| 10,778,659 | B2 | * | 9/2020  | Tola ........................ H04L 43/08 |
| 10,952,074 | B2 | * | 3/2021  | Verma ..................... G06F 21/32 |

(Continued)

FOREIGN PATENT DOCUMENTS

WO      2017051174 A1      3/2017

OTHER PUBLICATIONS

Invitation to Pay Additional Fees and Where Applicable Protest Fee and Partial International Search for Application No. PCT/US2023/070006, mailed Oct. 9, 2023, 16 pages.

*Primary Examiner* — Moustafa M Meky
(74) *Attorney, Agent, or Firm* — Patterson + Sheridan, LLP

(57) ABSTRACT

Techniques and protocols for enhancing wireless communications between an analyte sensor system and one or more other devices are described. Such techniques may include, for example, dynamic adjustment of transmission power when transmitting invitations, transmitting invitations with alternate (or different) payloads during different invitation periods, a reduction of handshake messages (e.g., client characteristic configuration descriptor (CCCD) messaging), etc. The various enhancements described herein may relate to various aspects of wireless communication protocols, including, for example, authentication, connection protocols, invitation message structure and content, device pairing, data transmission, etc.

15 Claims, 13 Drawing Sheets

(56) References Cited

U.S. PATENT DOCUMENTS

| | | | |
|---|---|---|---|
| 11,265,850 B2* | 3/2022 | Werb | H04W 56/002 |
| 11,457,810 B2* | 10/2022 | Van Tassel | H04W 12/50 |
| 2015/0082380 A1* | 3/2015 | Nairn | H04L 63/1466 |
| | | | 726/2 |
| 2017/0281060 A1 | 10/2017 | Wedekind et al. | |
| 2017/0286656 A1* | 10/2017 | Kohli | H04L 63/0428 |

* cited by examiner

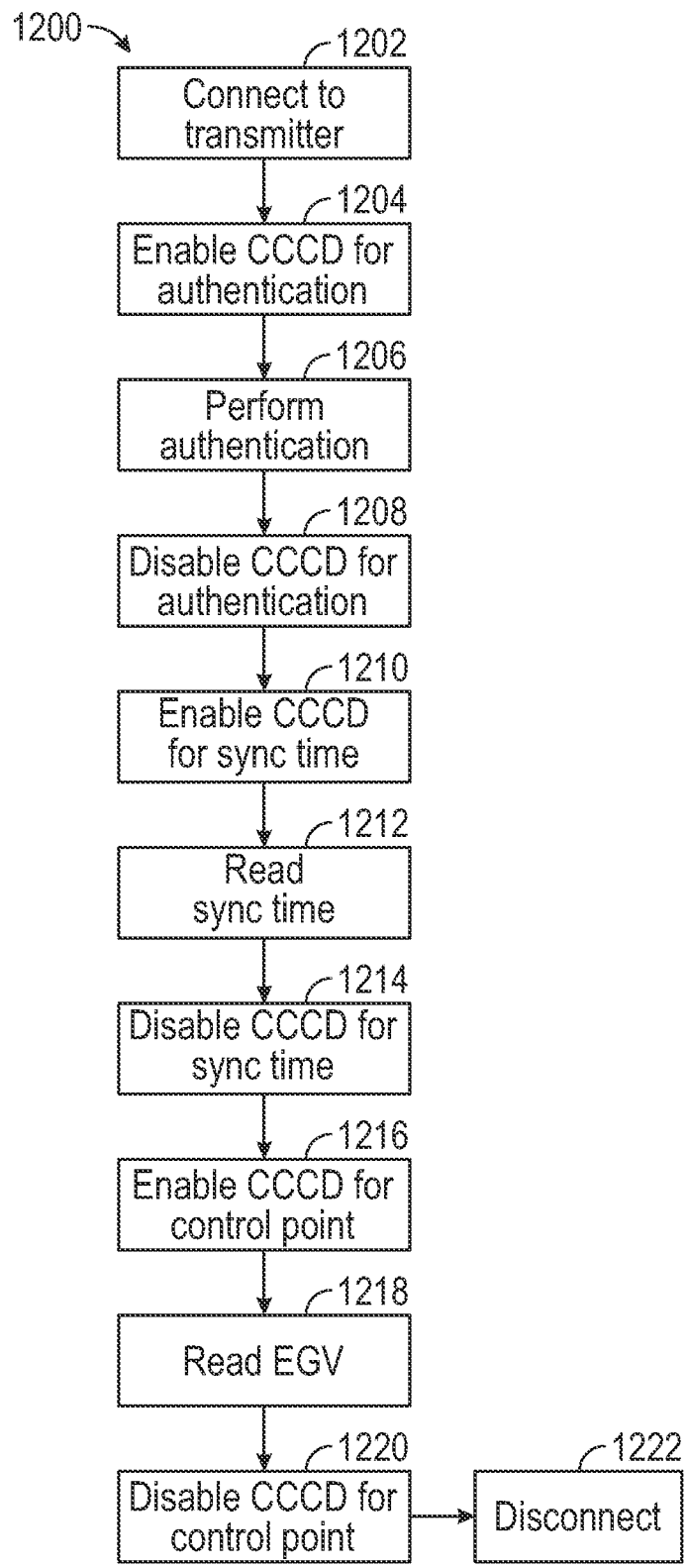
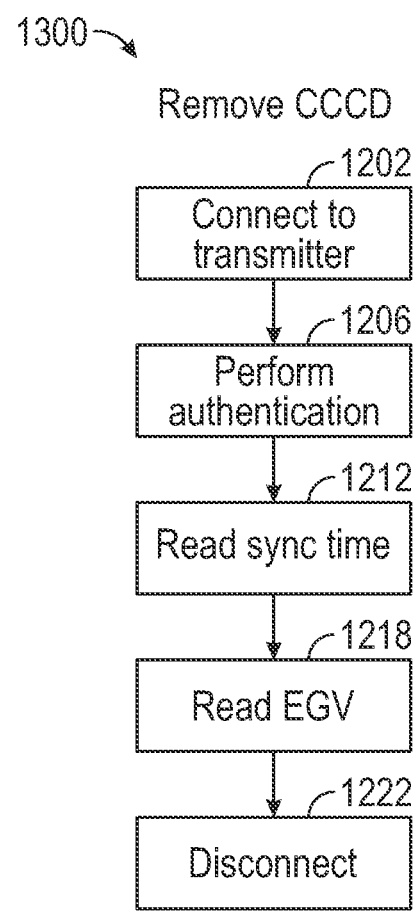
FIG. 12
FIG. 13

SYSTEMS AND METHODS FOR ENHANCED WIRELESS COMMUNICATIONS BETWEEN ANALYTE SENSOR SYSTEMS AND DISPLAY DEVICES

CROSS REFERENCE TO RELATED APPLICATIONS

This application claims benefit of and priority to U.S. Provisional Application No. 63/368,631, filed Jul. 15, 2022, which is assigned to the assignee hereof and hereby expressly incorporated by reference herein in its entirety as if fully set forth below and for all applicable purposes.

INTRODUCTION

Field

The present application relates generally to medical devices such as analyte sensors and, more particularly, to systems, devices, and methods related to wireless communications between analyte sensor systems (e.g., continuous glucose monitoring (CGM) devices) and one or more display devices.

Description of the Related Technology

Diabetes is a metabolic condition relating to the production or use of insulin by the body. Insulin is a hormone that allows the body to use glucose for energy, or store glucose as fat.

Diabetes mellitus is a disorder in which the pancreas cannot create sufficient insulin (Type I or insulin dependent) and/or in which insulin is not effective (Type 2 or non-insulin dependent). In the diabetic state, the victim suffers from high blood sugar, which causes an array of physiological derangements (kidney failure, skin ulcers, or bleeding into the vitreous of the eye) associated with the deterioration of small blood vessels. A hypoglycemic reaction (low blood sugar) may be induced by an inadvertent overdose of insulin, or after a normal dose of insulin or glucose-lowering agent accompanied by extraordinary exercise or insufficient food intake.

Conventionally, a diabetic patient carries a self-monitoring blood glucose (SMBG) monitor, which may require uncomfortable finger pricking methods. Due to the lack of comfort and convenience, a diabetic will normally only measure his or her glucose level two to four times per day. Unfortunately, these time intervals are spread so far apart that the diabetic will likely be alerted to a hyperglycemic or hypoglycemic condition too late, sometimes incurring dangerous side effects as a result. In fact, it is unlikely that a diabetic will take a timely SMBG value, and further the diabetic will not know if his blood glucose value is going up (higher) or down (lower), due to limitations of conventional methods.

Consequently, a variety of non-invasive, transdermal (e.g., transcutaneous) and/or implantable sensors are being developed for continuously detecting and/or quantifying blood glucose values. Generally, in a diabetes management system, a transmitter associated with the sensor wirelessly transmits raw or minimally processed data for subsequent display and/or analysis at one or more remote devices, which may include a remote device, a server, or any other types of communication devices. A remote device, such as a mobile device, may then utilize a trusted software application (e.g., approved and/or provided by the manufacturer of the sensor), which takes the raw or minimally processed data and provides the user with information about the user's blood glucose levels. Because diabetes management systems using such implantable sensors may provide more up-to-date information to users, they may reduce the risk of a user failing to regulate the user's blood glucose levels.

Although existing wireless communications protocols and techniques for wireless communications between an implantable analyte sensor and a remote device may be acceptable, they also have certain shortcomings. Accordingly, there is a need for improvements to existing wireless communications protocols and techniques used for wireless communications between implantable analyte sensors and one or more remote devices.

This background is provided to introduce a brief context for the summary and detailed description that follow. This background is not intended to be an aid in determining the scope of the claimed subject matter nor be viewed as limiting the claimed subject matter to implementations that solve any or all of the disadvantages or problems presented above.

SUMMARY

Certain embodiments provide a method for wireless communication performed by an analyte sensor system. The method includes transmitting one or more first advertising messages having a first payload size when a whitelist of previously authenticated devices has at least one unfilled entry. The method also includes transmitting one or more second advertising messages having a second payload size, smaller than the first payload size, when the whitelist lists at least one device. The method further includes establishing a communication session between the analyte sensor system and at least one device, based on at least one of the first advertising messages or the second advertising messages.

Certain embodiments provide a method for wireless communication performed by an analyte sensor system. The method includes establishing a connection between a transmitter of the analyte sensor system and a display device. The method also includes receiving at least a first packet from the display device after establishing the connection. The method also includes determining a transmission power for a second packet, based at least in part on a current transmission power level of the transmitter and a signal strength of the first packet. The method further includes transmitting the second packet to the display device at the transmission power determined for the second packet.

Certain embodiments provide a method for wireless communication performed by an analyte sensor system. The method includes determining one or more properties for a set of predefined characteristics associated with the analyte sensor system. The method also includes configuring, via a custom profile of the analyte sensor system, each of the one or more properties to have a client characteristic configuration descriptor (CCCD) enabled as a default setting upon each connection between the analyte sensor system and a display device. The method further includes, prior to initialization of a processor of the analyte sensor system, configuring the processor with the configured one or more properties.

Further embodiments include a non-transitory computer-readable storage medium storing executable instructions that, when executed by a computer system, cause the computer system to perform the methods set forth above, and an apparatus including at least one processor and memory configured to carry out the methods set forth above.

BRIEF DESCRIPTION OF THE DRAWINGS

FIG. 12 illustrates an example connection flow between an analyte sensor system and a display device.

FIG. 13 illustrates an example connection flow with reduced handshake messages, according to certain embodiments disclosed herein.

DETAILED DESCRIPTION OF CERTAIN INVENTIVE EMBODIMENTS

Figure 1:
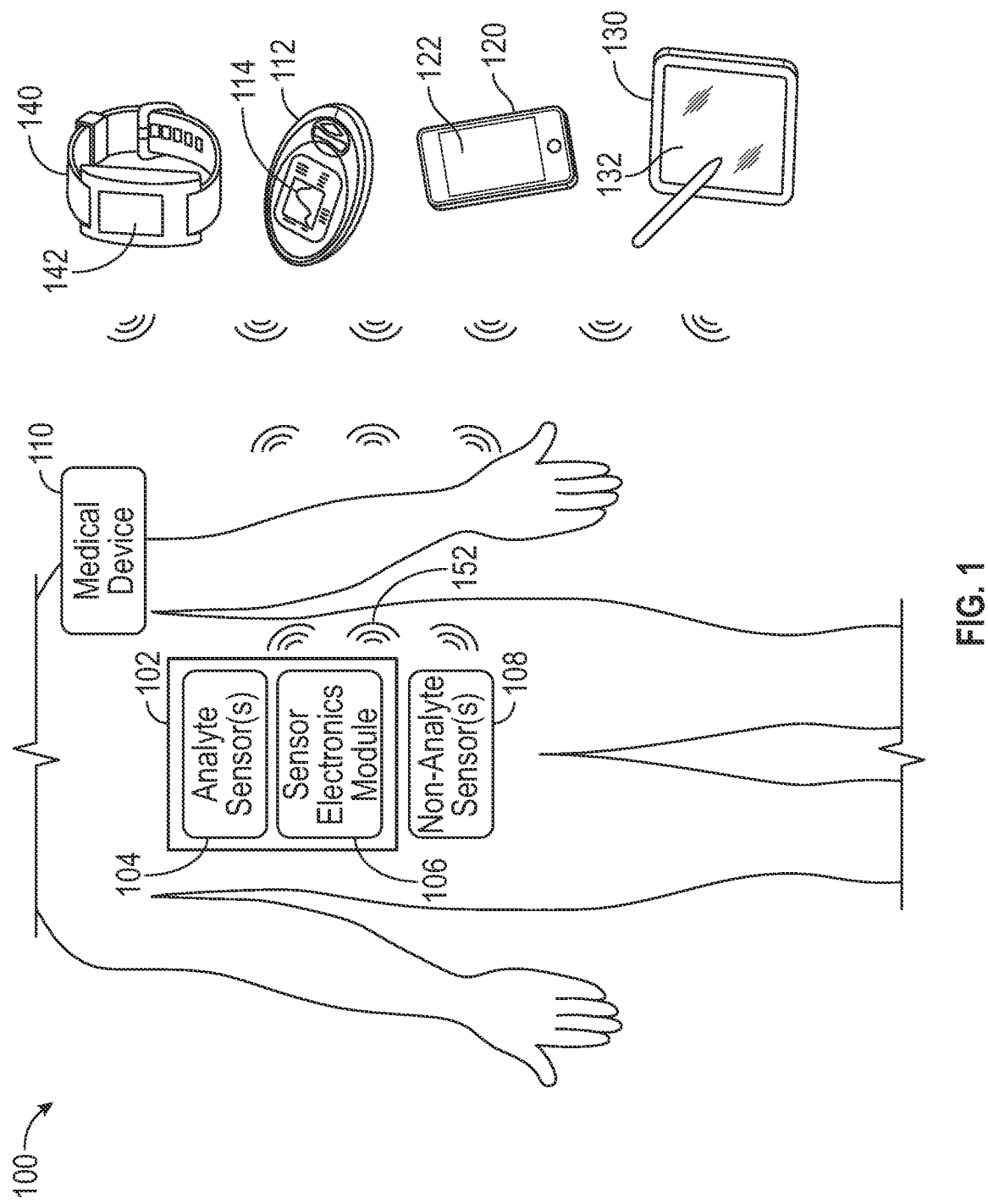
FIG. 1 illustrates an example analyte monitoring system, according to certain embodiments disclosed herein.

Certain embodiments described herein relate to a number of techniques for use in wireless communications between a display device, an analyte sensor system, and/or a medical device (e.g., medical delivery device) to exchange data, such as analyte data and other types of data. Certain embodiments may reduce technical issues associated with the wireless transmission of analyte data that lead to increased power consumption (and, in turn, reduced battery life) of devices referred to above. Such technical issues may include, for example, transmitting messages with high overhead, transmitting messages at unnecessarily high transmission power levels, transmitting an unnecessary number of messages as part of data communications between the devices, etc. Although certain embodiments herein are described with respect to the management of diabetes, a glucose sensor system, and the transmission of glucose measurements between devices, the protocols and techniques described herein are similarly applicable to any type of health management system that includes any type of analyte sensor (e.g., a lactate sensor, a ketone sensor, a potassium sensor, and the like).

Battery consumption is a critical issue of concern for devices (e.g., display devices, analyte sensor systems, medical devices, etc.) that wirelessly exchange analyte data. Current wireless communication protocols used for transmitting analyte data may consume excessive resources, such as power resources, bandwidth and other communication resources, computing resources, etc. For example, such wireless communication protocols may cause a device (e.g., analyte sensor system) to transmit messages at unnecessarily high transmission power levels, cause the device to transmit messages with high overhead, cause the device to transmit an unnecessary number of messages when connecting or communicating with another device (e.g., display device), any one of (or combination of) which may lead to increased power (and battery) consumption.

For instance, according to certain communication protocols between an analyte sensor system and a display device, upon activation of the analyte sensor system, the analyte sensor system begins periodically broadcasting invitation packets (e.g., advertisement packets) at defined intervals for a certain length of time (e.g., every 5 minutes for up to 22 seconds) in order to be identified by and connect with a user's display device. Typically, as described in more detail herein, the length of time during which the analyte sensor system broadcasts invitation packets is inclusive of a generic invitation period (e.g., 2 seconds) as well as a targeted invitation period (e.g., 20 seconds).

Generic inviting (also referred to as generic invitation) refers to broadcasting invitation packets (or messages) at the analyte sensor system to connect, for the first (or initial) time, with the user's display devices. For example, when a patient initially attempts to pair a display device with an analyte sensor system, the analyte sensor system may broadcast generic invitation packets. Once a generic invitation packet (e.g., generic advertisement packet) is received by the intended display device, the display device issues a connection request to the analyte sensor system. The analyte sensor system then receives the connection request from the display device and may grant the connection request to the display device. The analyte sensor system and the display device may then proceed to engage in further data communication involving authentication, pairing, bonding, etc., after the initial connection is made.

Compared to generic inviting, targeted inviting (also referred to as targeted invitation) refers to transmitting invitation packets (e.g., targeted advertisement packets) at the analyte sensor system to reconnect with a display device that the analyte sensor system has already once paired and bonded with. Continuing with the above example, when the patient's analyte sensor system attempts to reconnect with the patient's display device, the analyte sensor system may send one or more targeted invitation packets to the display device. Upon receiving a targeted invitation, the display device issues a connection request to the analyte sensor system. The analyte sensor system grants the connection request and may engage in further data communication with the display device.

One issue with using the above wireless communication protocol(s) is unnecessary battery consumption at the patient's analyte sensor system. In particular, once a connection is made between the analyte sensor system and the display device, the analyte sensor system may transmit packets at a constant transmission power level notwithstanding the strength of signals being received from the display device in response. However, because transmitting at a constant transmission power level may not be necessary for communicating with an intended display device, using a constant transmission power may lead to increased power consumption and, in turn, unnecessary battery consumption at the analyte sensor system. Additionally, using the above wireless communication protocol(s), the analyte sensor system may transmit packets with a same full payload during both generic inviting and targeted inviting. However, because a full payload may not be necessary for targeted inviting as described further below, transmitting full-payload targeted invitation packets may lead to increased power consumption and, in turn, unnecessary battery consumption at the analyte sensor system.

Further, certain analyte sensor systems may use Client Characteristic Configuration Descriptor (CCCD) to allow a display device to opt-in to "push" style data updates from the analyte sensor system, as opposed to just reading data from the analyte sensor system. In such analyte sensor systems, before the display device is able to obtain any of this "pushed" data, the display device has to separately enable CCCD for each portion of data, and then the display device has to separately disable CCCD for the portion of data once it has been obtained. This frequent enabling and disabling of CCCD for each characteristic (or data) may lead to unnecessary battery consumption of the analyte sensor system. Additionally, enabling and disabling of CCCD may cause increased signal loss due to errors involving enabling CCCD.

Accordingly, what is needed are techniques, methods, and systems for wirelessly communicating analyte data that allow for reduced resource consumption (e.g., power, compute, bandwidth, etc.) at analyte sensor systems while maintaining and/or improving performance with respect to the reliability, speed, and accuracy of wireless communications, as well as the connection protocols associated therewith. Note that, although embodiments described herein refer to an analyte sensor system performing communications with one or more display devices, it should be understood that it is a transmitter in the analyte sensor system that performs the communications with the one or more display devices.

Certain embodiments described herein provide various enhancements to wireless communication protocols, such as BLE protocols, used for exchanging data, such as analyte data obtained from a continuous analyte sensor configured to continuously measure a concentration of analyte in a host. A transmitter coupled to the continuous analyte sensor may use the various enhancements when transmitting analyte data to one or more display devices. Such enhancements may include, for example, dynamic adjustment of transmission power when transmitting packets (e.g., data, invitations, etc.), transmitting invitations with alternate (or different) payloads during different invitation periods, a reduction of handshake messages (e.g., CCCD messaging), etc. The various enhancements described herein may relate to various aspects of wireless communication protocols, including, for example, authentication, connection protocols, invitation message structure and content, device pairing, data transmission, and the like.

The techniques described herein that allow for reduced power consumption during wireless transmission of analyte data are described more fully herein with respect to FIGS. 1-15 below. The techniques described herein may provide power cost savings to the analyte sensor system and one or more display devices, and an improved user experience.

Example Analyte Sensor System

FIG. 1 depicts an analyte monitoring system 100 ("system 100"), such as a diabetes management system, that may be used in connection with certain embodiments of the present disclosure that involve gathering, monitoring, and/or providing information regarding analyte values present in a user's body, including, for example, the user's blood glucose values.

Analyte monitoring system 100 in the illustrated embodiment includes an analyte sensor system 102, which may be configured to monitor one or more analytes of a user. The analyte sensor system 102 includes a sensor electronics module 106 and one or more analyte sensor(s) 104 (individually referred to herein as analyte sensor 104 and collectively referred to herein as analyte sensors 104) associated with sensor electronics module 106. Sensor electronics module 106 may be in wireless communication (e.g., directly or indirectly) with one or more of display devices 112, 120, 130, and 140. In certain embodiments, sensor electronics module 106 may also be in wireless communication (e.g., directly or indirectly) with one or more medical devices, such as medical devices 110 (individually referred to herein as medical device 110 and collectively referred to herein as medical devices 110), and/or one or more other non-analyte sensors 108 (individually referred to herein as non-analyte sensor 108 and collectively referred to herein as non-analyte sensor 108).

In certain embodiments, the analyte sensor system 102 is provided for measurement of an analyte(s) in a host or a user. By way of an overview and an example, and not by way of limitation, the analyte sensor system 102 may be implemented as an encapsulated microcontroller that makes sensor measurements, generates analyte data (e.g., by calculating values for continuous glucose monitoring data), and engages in wireless communications (e.g., via Bluetooth and/or other wireless protocols) to send such data to one or more display devices, such as display devices 112, 120, 130, and 140.

Analyte sensor(s) 104 is configured to measure a concentration or level of analyte(s) in the host. The term analyte is further defined by paragraph of U.S. App. No. 2019/0336053. Paragraph [0117] of U.S. App. No. 2019/0336053 is incorporated herein by reference. In certain embodiments, the analyte sensor 104 includes a continuous glucose sensor, such as a subcutaneous, transdermal (e.g., transcutaneous), or intravascular device. In certain embodiments, analyte sensor 104 may analyze a plurality of intermittent blood samples. Analyte sensor 104 may use any method of glucose-measurement, including enzymatic, chemical, physical, electrochemical, spectrophotometric, polarimetric, calorimetric, iontophoretic, radiometric, immunochemical, and the like. Additional details relating to a continuous glucose sensor are provided in paragraphs [0072]-[0076] of U.S. application Ser. No. 13/827,577. Paragraphs [0072]-[0076] of U.S. application Ser. No. 13/827,577 are incorporated herein by reference.

Note that, while in certain examples, analyte sensor system 102 is assumed to be a glucose sensor system, analyte sensor system 102 may operate to monitor one or more additional or alternative analytes. The term "analyte" as used herein is a broad term that is to be given its ordinary and customary meaning to a person of ordinary skill in the art (and is not to be limited to a special or customized meaning), and refers without limitation to a substance or chemical constituent in the body or a biological sample (e.g., bodily fluids, including, blood, serum, plasma, interstitial fluid, cerebral spinal fluid, lymph fluid, ocular fluid, saliva, oral fluid, urine, excretions, or exudates). Analytes may include naturally occurring substances, artificial substances, metabolites, and/or reaction products. In some embodiments, the analyte for measurement by the sensing regions, devices, and methods is albumin, alkaline phosphatase, alanine transaminase, aspartate aminotransferase, bilirubin, blood urea nitrogen, calcium, CO2, chloride, creatinine, glucose, gamma-glutamyl transpeptidase, hematocrit, lactate, lactate dehydrogenase, magnesium, oxygen, pH, phosphorus, potassium, sodium, total protein, uric acid, metabolic markers, drugs.

Other analytes are contemplated as well, including but not limited to acetaminophen, dopamine, ephedrine, terbutaline, ascorbate, uric acid, oxygen, d-amino acid oxidase, plasma amine oxidase, xanthine oxidase, NADPH oxidase, alcohol oxidase, alcohol dehydrogenase, pyruvate dehydrogenase, diols, Ros, NO, bilirubin, cholesterol, triglycerides, gentisic acid, ibuprophen, L-Dopa, methyl dopa, salicylates, tetracycline, tolazamide, tolbutamide, acarboxyprothrombin; acylcarnitine; adenine phosphoribosyl transferase; adenosine deaminase; albumin; alpha-fetoprotein; amino acid profiles (arginine (Krebs cycle), histidine/urocanic acid, homocysteine, phenylalanine/tyrosine, tryptophan); andrenostenedione; antipyrine; arabinitol enantiomers; arginase; benzoylecgonine (cocaine); biotinidase; biopterin; c-reactive protein; carnitine; carnosinase; CD4; ceruloplasmin; chenodeoxycholic acid; chloroquine; cholesterol; cholinesterase; conjugated 1-β hydroxy-cholic acid; cortisol; creatine kinase; creatine kinase MM isoenzyme; cyclosporin A; d-penicillamine; de-ethylchloroquine; dehydroepiandrosterone sulfate; DNA (acetylator polymorphism, alcohol dehydrogenase, alpha 1-antitrypsin, cystic fibrosis, Duchenne/Becker muscular dystrophy, glucose-6-phosphate dehydrogenase, hemoglobin A, hemoglobin S, hemoglobin C, hemoglobin D, hemoglobin E, hemoglobin F, D-Punjab, beta-thalassemia, hepatitis B virus, HCMV, HIV-1, HTLV-1, Leber hereditary optic neuropathy, MCAD, RNA, PKU, *Plasmodium vivax*, sexual differentiation, 21-deoxycortisol); desbutylhalofantrine; dihydropteridine reductase; diptheria/tetanus antitoxin; erythrocyte arginase; erythrocyte protoporphyrin; esterase D; fatty acids/acylglycines; free β-human chorionic gonadotropin; free erythrocyte porphyrin; free thyroxine (FT4); free tri-iodothyronine (FT3); fumarylacetoacetase; galactose/gal-1-phosphate; galactose-1-phosphate uridyltransferase; gentamicin; glucose-6-phosphate dehydrogenase; glutathione; glutathione perioxidase; glycocholic acid; glycosylated hemoglobin; halofantrine; hemoglobin variants; hexosaminidase A; human erythrocyte carbonic anhydrase I; 17-alpha-hydroxyprogesterone; hypoxanthine phosphoribosyl transferase; immunoreactive trypsin; lactate; lead; lipoproteins ((a), B/A-1, β); lysozyme; mefloquine; netilmicin; phenobarbitone; phenyloin; phytanic/pristanic acid; progesterone; prolactin; prolidase; purine nucleoside phosphorylase; quinine; reverse tri-iodothyronine (rT3); selenium; serum pancreatic lipase; sissomicin; somatomedin C; specific antibodies (adenovirus, anti-nuclear antibody, anti-zeta antibody, arbovirus, Aujeszky's disease virus, dengue virus, *Dracunculus medinensis, Echinococcus granulosus, Entamoeba histolytica,* enterovirus, *Giardia duodenalisa, Helicobacter pylori,* hepatitis B virus, herpes virus, HIV-1, IgE (atopic disease), influenza virus, *Leishmania donovani*, leptospira, measles/mumps/rubella, *Mycobacterium leprae, Mycoplasma pneumoniae,* Myoglobin, *Onchocerca volvulus*, parainfluenza virus, *Plasmodium falciparum*, poliovirus, *Pseudomonas aeruginosa*, respiratory syncytial virus, *rickettsia* (scrub typhus), *Schistosoma mansoni, Toxoplasma gondii, Trepenoma pallidium, Trypanosoma cruzi*/rangeli, vesicular *stomatis* virus, *Wuchereria bancrofti*, yellow fever virus); specific antigens (hepatitis B virus, HIV-1); succinylacetone; sulfadoxine; theophylline; thyrotropin (TSH); thyroxine (T4); thyroxine-binding globulin; trace elements; transferrin; UDP-galactose-4-epimerase; urea; uroporphyrinogen I synthase; vitamin A; white blood cells; and zinc protoporphyrin. Salts, sugar, protein, fat, vitamins, and hormones naturally occurring in blood or interstitial fluids may also constitute analytes in certain embodiments.

The analyte may be naturally present in the biological fluid, for example, a metabolic product, a hormone, an antigen, an antibody, and the like. Alternatively, the analyte may be introduced into the body, for example, a contrast agent for imaging, a radioisotope, a chemical agent, a fluorocarbon-based synthetic blood, or a drug or pharmaceutical composition, including but not limited to insulin; ethanol; cannabis (marijuana, tetrahydrocannabinol, hashish); inhalants (nitrous oxide, amyl nitrite, butyl nitrite, chlorohydrocarbons, hydrocarbons); cocaine (crack cocaine); stimulants (amphetamines, methamphetamines, Ritalin, Cylert, Preludin, Didrex, PreState, Voranil, Sandrex, Plegine); depressants (barbituates, methaqualone, tranquilizers such as Valium, Librium, Miltown, Serax, Equanil, Tranxene); hallucinogens (phencyclidine, lysergic acid, mescaline, peyote, psilocybin); narcotics (heroin, codeine, morphine, opium, meperidine, Percocet, Percodan, Tussionex, Fentanyl, Darvon, Talwin, Lomotil); designer drugs (analogs of fentanyl, meperidine, amphetamines, methamphetamines, and phencyclidine, for example, Ecstasy); anabolic steroids; and nicotine. The metabolic products of drugs and pharmaceutical compositions are also contemplated analytes. Analytes such as neurochemicals and other chemicals generated within the body may also be analyzed, such as, for example, ascorbic acid, uric acid, dopamine, noradrenaline, 3-methoxytyramine (3MT), 3,4-dihydroxyphenylacetic acid (DOPAC), homovanillic acid (HVA), 5-hydroxytryptamine (5HT), histamine, Advanced Glycation End Products (AGEs) and 5-hydroxyindoleacetic acid (FHIAA).

With further reference to FIG. 1, in certain embodiments, sensor electronics module 106 includes electronic circuitry associated with measuring and processing analyte sensor data or information, including algorithms associated with processing and/or calibration of the analyte sensor data/information. Sensor electronics module 106 may be physically/mechanically connected to analyte sensor(s) 104 and may be integral with (i.e., non-releasably attached to) or releasably attachable to analyte sensor(s) 104.

Sensor electronics module 106 may also be electrically coupled to analyte sensor(s) 104, such that the components may be electromechanically coupled to one another (e.g., (a) prior to insertion into a patient's body, or (b) during the insertion into the patient's body). Sensor electronics module 106 may include hardware, firmware, and/or software that enable measurement and/or estimation of levels of the analyte in a host/user via analyte sensor 104 (e.g., which may be/include a glucose sensor). For example, sensor electronics module 106 may include one or more potentiostats, a power source for providing power to analyte sensor 104, other components useful for signal processing and data storage, and a telemetry module for transmitting data from the sensor electronics module to one or more display devices. Electronics may be affixed to a printed circuit board (PCB) within SS 8, or platform or the like, and may take a variety of forms. For example, the electronics may take the form of an integrated circuit (IC), such as an Application-Specific Integrated Circuit (ASIC), a microcontroller, a processor, and/or a state machine.

Sensor electronics module 106 may include sensor electronics that are configured to process sensor information, such as sensor data, and generate transformed sensor data and displayable sensor information. Examples of systems and methods for processing sensor analyte data are described in more detail herein and in U.S. Pat. Nos. 7,310,544 and 6,931,327 and U.S. Patent Publication Nos. 2005/0043598, 2007/0032706, 2007/0016381, 2008/0033254, 2005/0203360, 2005/0154271, 2005/0192557, 2006/0222566, 2007/0203966 and 2007/0208245, all of which are incorporated herein by reference in their entireties.

Display devices 112, 120, 130, and/or 140 are configured for displaying displayable sensor data, including analyte data, which may be transmitted by sensor electronics module 106. Each of display devices 112, 120, 130, and 140 may include a display such as a touchscreen display 114, 122, 132, and 142, respectively, for displaying sensor data to a user and/or receiving inputs from the user. For example, a graphical user interface (GUI) may be presented to the user for such purposes. In some embodiments, the display devices may include other types of user interfaces such as a voice user interface instead of, or in addition to, a touchscreen display for communicating sensor data to the user of the display device and/or receiving user inputs. In some embodiments, one, some, or all of the display devices 112, 120, 130, and 140 are configured to display or otherwise communicate the sensor data as it is communicated from the sensor electronics module 106 (e.g., in a data package that is transmitted to respective display devices), without any additional prospective processing required for calibration and/or real-time display of the sensor data.

The plurality of display devices depicted in FIG. 1 may include a custom or proprietary display device specially designed for displaying certain types of displayable sensor information associated with analyte data received from sensor electronics module 106 (e.g., a numerical value and/or an arrow, in certain embodiments). Display device 112 is an example of such a custom device. In certain embodiments, one of the plurality of display devices depicted in FIG. 1 is a smartphone, such as display device 120, which may be based on an Android, iOS, or another operating system (OS) configured to display a graphical representation of the continuous sensor data (e.g., including current and/or historic data). Other display devices may include other hand-held devices, such as display device 130 which represents a tablet, display device 140 which represents a smart watch, medical device 110 (e.g., an insulin delivery device or a blood glucose meter), and/or a desktop or laptop computer (not shown).

Because different display devices provide different user interfaces, content of the data packages (e.g., amount, format, and/or type of data to be displayed, alarms, and the like) may be customized (e.g., programmed differently by the manufacturer and/or by an end user) for each particular display device. Accordingly, in certain embodiments, a plurality of different display devices may be in direct wireless communication with a sensor electronics module (e.g., such as an on-skin sensor electronics module 106 that is physically connected to analyte sensor(s) 104) during a sensor session to enable a plurality of different types and/or levels of display and/or functionality associated with the displayable sensor data.

As noted, sensor electronics module 106 may be in communication with a medical device 110. Medical device 110 may be a passive device in some example embodiments of the disclosure. For example, medical device 110 may be an insulin pump for administering insulin to a user. For a variety of reasons, it may be desirable for such an insulin pump to receive and track potassium and/or glucose values transmitted from analyte sensor system 102, where analyte sensor 104 is configured to measure potassium and/or glucose. For example, the medical device 110 may be configured to administer a certain dosage of insulin or another medicament to the user based on the sensor information and/or analyte data received from the analyte sensor system 102.

Further, as noted, sensor electronics module 106 may also be in communication with other non-analyte sensors 108. Non-analyte sensors 108 may include, but are not limited to, an altimeter sensor, an accelerometer sensor, a temperature sensor, a respiration rate sensor, a sweat sensor, etc. Non-analyte sensors 108 may also include monitors such as heart rate monitors, ECG monitors, blood pressure monitors, pulse oximeters, caloric intake, and medicament delivery devices. Non-analyte sensors 108 may also include data systems for measuring non-patient specific phenomena such as time, ambient pressure, or ambient temperature which could include an atmospheric pressure sensor, an external air temperature sensor or a clock, timer, or other time measure of when in time the sensor was first insertion or the time of sensor life remaining compared to insertion time could be used as calibration or other data inputs for an algorithmic model.

In certain embodiments, the non-analyte sensors 108 may be combined in any other configuration, such as combined with one or more analyte sensors 104. As an illustrative example, a non-analyte sensor, e.g., a temperature sensor, may be combined with an analyte sensor 104 configured to measure potassium to form a potassium/temperature sensor used to transmit sensor data to sensor electronics module 106 using common communication circuitry. As another illustrative example, a non-analyte sensor, e.g., a temperature sensor, may be combined with an analyte sensor 104 configured to measure potassium and glucose (e.g., multiple analytes) to form a potassium/glucose/temperature sensor used to transmit sensor data to the sensor electronics module 106 using common communication circuitry.

In certain embodiments, the analyte sensor system 102, the multiple display devices 112, 120, 130, 140, the medical device 110, and/or non-analyte sensor(s) 108 are configured to wirelessly communicate over wireless communication paths 152 using short range wireless communication protocols. Examples of short range wireless communication protocols include Bluetooth and BLE protocols. In certain embodiments, other short range wireless communications may include Near Field Communications (NFC), radio frequency identification (RFID) communications, IR (infrared) communications, etc.

In certain embodiments, wireless communication protocols other than short range wireless communication protocols may be used for wireless communication paths 152, such as WiFi Direct. In certain embodiments, a wireless access point (WAP) (not shown) is used to couple one or more of analyte sensor system 102, display devices 112, 120, 130, and 140, medical device 110, and/or non-analyte sensor(s) 108 to one another. For example, a WAP may provide WiFi and/or cellular connectivity among these devices.

Figure 2A:
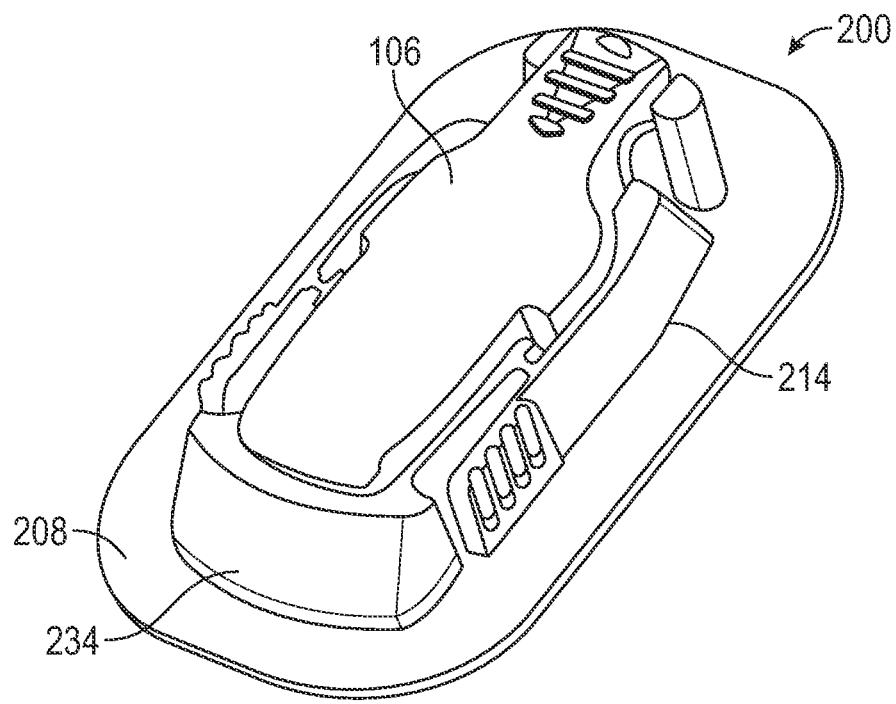
FIG. 2A is a perspective view of an example enclosure, according to certain embodiments disclosed herein.
Figure 2B:
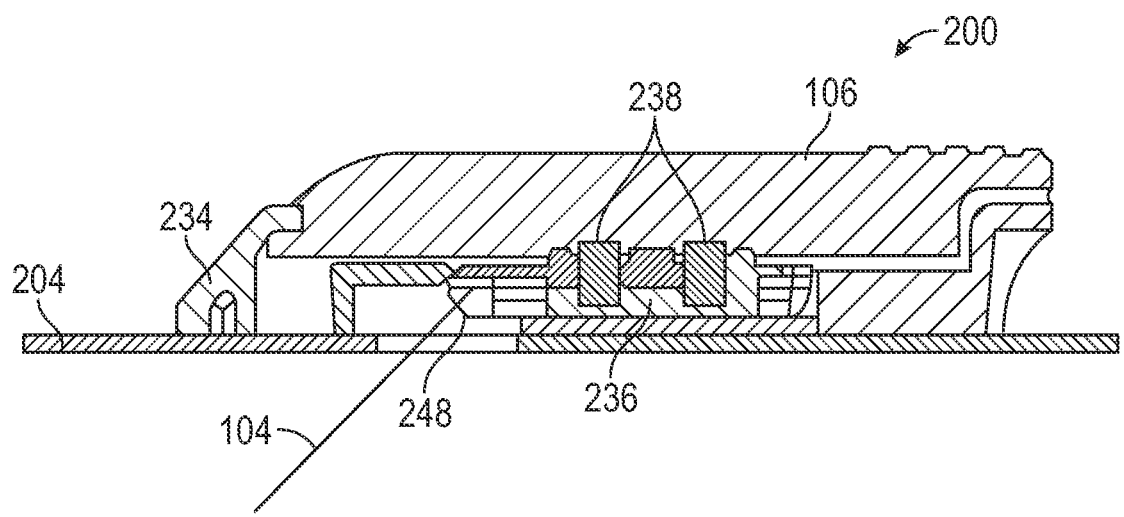
FIG. 2B is a cross-sectional view of an example enclosure, according to certain embodiments disclosed herein.

FIGS. 2A and 2B are perspective and cross-sectional views of enclosure 200 that may be used in connection with implementing embodiments of analyte sensor system 102, according to certain embodiments. Enclosure 200 includes mounting unit 214 and sensor electronics module 106 attached thereto in certain embodiments. Enclosure 200 is shown in a functional position, including mounting unit 214 and sensor electronics module 106 matingly engaged therein. In some embodiments, mounting unit 214, also referred to as a housing or sensor pod, includes base 234 adapted for fastening to a host's or user's skin. Base 234 may be formed from a variety of hard or soft materials and may include a low profile for minimizing protrusion of the device from the host during use. In some embodiments, base 234 is formed at least partially from a flexible material, which may provide numerous advantages over other transcutaneous sensors, which, unfortunately, may suffer from motion-related artifacts associated with the host's movement when the host is using the device. Mounting unit 214 and/or sensor electronics module 106 may be located over the sensor insertion site to protect the site and/or provide a minimal footprint (utilization of surface area of the host's skin).

In some embodiments, a detachable connection between mounting unit 214 and sensor electronics module 106 is provided, which enables improved manufacturability, namely, the potentially relatively inexpensive mounting unit 214 may be disposed of when refurbishing or maintaining analyte sensor system 102, while the relatively more expensive sensor electronics module 106 may be reusable with multiple sensor systems. In some embodiments, sensor electronics module 106 is configured with signal processing (programming), for example, configured to filter, calibrate, and/or execute other algorithms useful for calibration and/or display of sensor information. However, an integral (non-detachable) sensor electronics module may be configured.

In some embodiments, contacts 238 are mounted on or in a subassembly hereinafter referred to as contact subassembly 236 configured to fit within base 234 of mounting unit 214 and hinge 248 that allows contact subassembly 236 to pivot between a first position (for insertion) and a second position (for use) relative to mounting unit 214. The term "hinge" as used herein is a broad term and is used in its ordinary sense, including, without limitation, to refer to any of a variety of pivoting, articulating, and/or hinging mechanisms, such as an adhesive hinge, a sliding joint, and the like; the term hinge does not necessarily imply a fulcrum or fixed point about which the articulation occurs. In some embodiments, contacts 238 are formed from a conductive elastomeric material, such as a carbon black elastomer, through which analyte sensor 104 extends.

With further reference to FIGS. 2A and 2B, in certain embodiments, mounting unit 214 is provided with adhesive pad 208, disposed on the mounting unit's back surface and includes a releasable backing layer. Thus, removing the backing layer and pressing at last a portion of base 234 of mounting unit 214 onto the host's skin adheres mounting unit 214 to the host's skin. Additionally, or alternatively, an adhesive pad may be placed over some or all of analyte sensor system 102 and/or analyte sensor 104 after sensor insertion is complete to ensure adhesion, and optionally to ensure an airtight seal or watertight seal around the wound exit-site (or sensor insertion site) (not shown). Appropriate adhesive pads may be chosen and designed to stretch, elongate, conform to, and/or aerate the region (e.g., host's skin). Configurations and arrangements may provide water resistant, waterproof, and/or hermetically sealed properties associated with the mounting unit/sensor electronics module embodiments described herein.

Figure 3A:
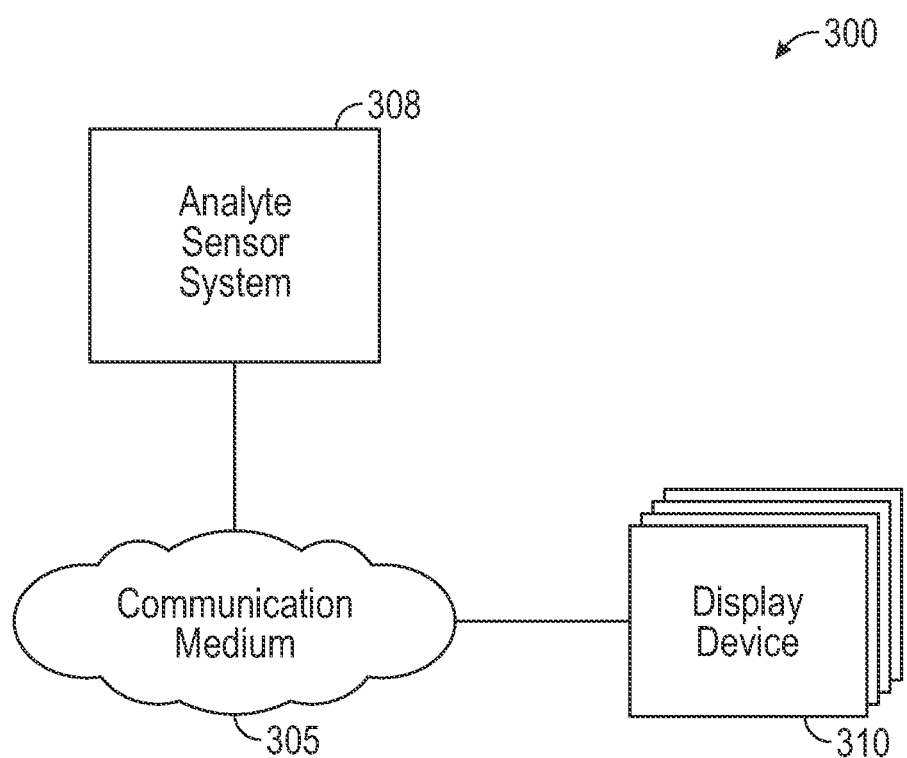
FIGS. 3A-3B illustrate example systems for communicating analyte data, according to certain embodiments disclosed herein.

FIG. 3A illustrates an example system 300, which may be used in connection with implementing certain embodiments of the disclosed systems, methods, and devices. By way of example, the various below-described components of FIG. 3A may be used to provide wireless communication of glucose data, for example between an analyte sensor system and a plurality of display devices, medical devices, servers and so on.

As shown, the system 300 includes analyte sensor system 308 and one or more display devices 310. Analyte sensor system 308 is coupled to display device(s) 310 via communication medium 305. Analyte sensor system 308 and display device(s) 310 may exchange messaging via communication medium 305, and communication medium 305 may be used to deliver analyte data to display device(s) 310. In certain embodiments, the analyte sensor system 308 is representative of the analyte sensor system 102 in FIG. 1 (e.g., the analyte sensor system 308 may also be designated analyte sensor system 102 in FIG. 1).

The display device(s) 310 may include a variety of electronic computing devices, such as, a smartphone, tablet, laptop, wearable device such as a smartwatch, etc. In certain embodiments, the display device(s) 310 includes any one of (or combination of) the display devices 112, 120, 130, and 140 depicted in FIG. 1. Here, it will be noted that a graphical user interface (GUI) of display device 310 may perform such functions as accepting user input and displaying menus as well as information derived from analyte data. The GUI may be provided by various operating systems known in the art, such as, iOS, Android, Windows Mobile, Windows, Mac OS, Chrome OS, Linux, Unix, a gaming platform OS (e.g., Xbox, PlayStation, Wii), etc. In certain embodiments, communication medium 305 is based on one or more wireless communication protocols such as Bluetooth, BLE, ZigBee, Wi-Fi, 802.11 protocols, IR, Radio Frequency (RF), 2G, 3E, 4G, 7G etc., and/or wired protocols and media.

In certain embodiments, the elements of system 300 may be used to perform various processes described herein and/or may be used to execute various operations described herein regarding one or more disclosed systems and methods. Upon studying the present disclosure, one of skill in the art will appreciate that system 300 may include multiple analyte sensor systems 308, communication medium 305 for communication utilizing the same or different communication protocols, and/or display devices 310.

As noted, communication medium 305 may be used to connect or communicatively couple analyte sensor system 308 and display devices 310 to one another or to a network, and communication medium 305 may be implemented in a variety of forms. For example, communication medium 305 may include an Internet connection, such as a local area network (LAN), a wide area network (WAN), a fiber optic network, internet over power lines, a hard-wired connection (e.g., a bus), and the like, or any other kind of network connection. Communication medium 305 may be implemented using any combination of routers, cables, modems, switches, fiber optics, wires, radio (e.g., microwave/RF links), and the like. Further, communication medium 305 may be implemented using various wireless standards, such as Bluetooth®, BLE, Wi-Fi, 3EPP standards (e.g., 2G GSM/GPRS/EDGE, 3E UMTS/CDMA2000, 4G LTE/LTE-U, 5G), etc. Upon reading the present disclosure, one of skill in the art will recognize other ways to implement communication medium 305 for communications purposes.

Figure 3B:
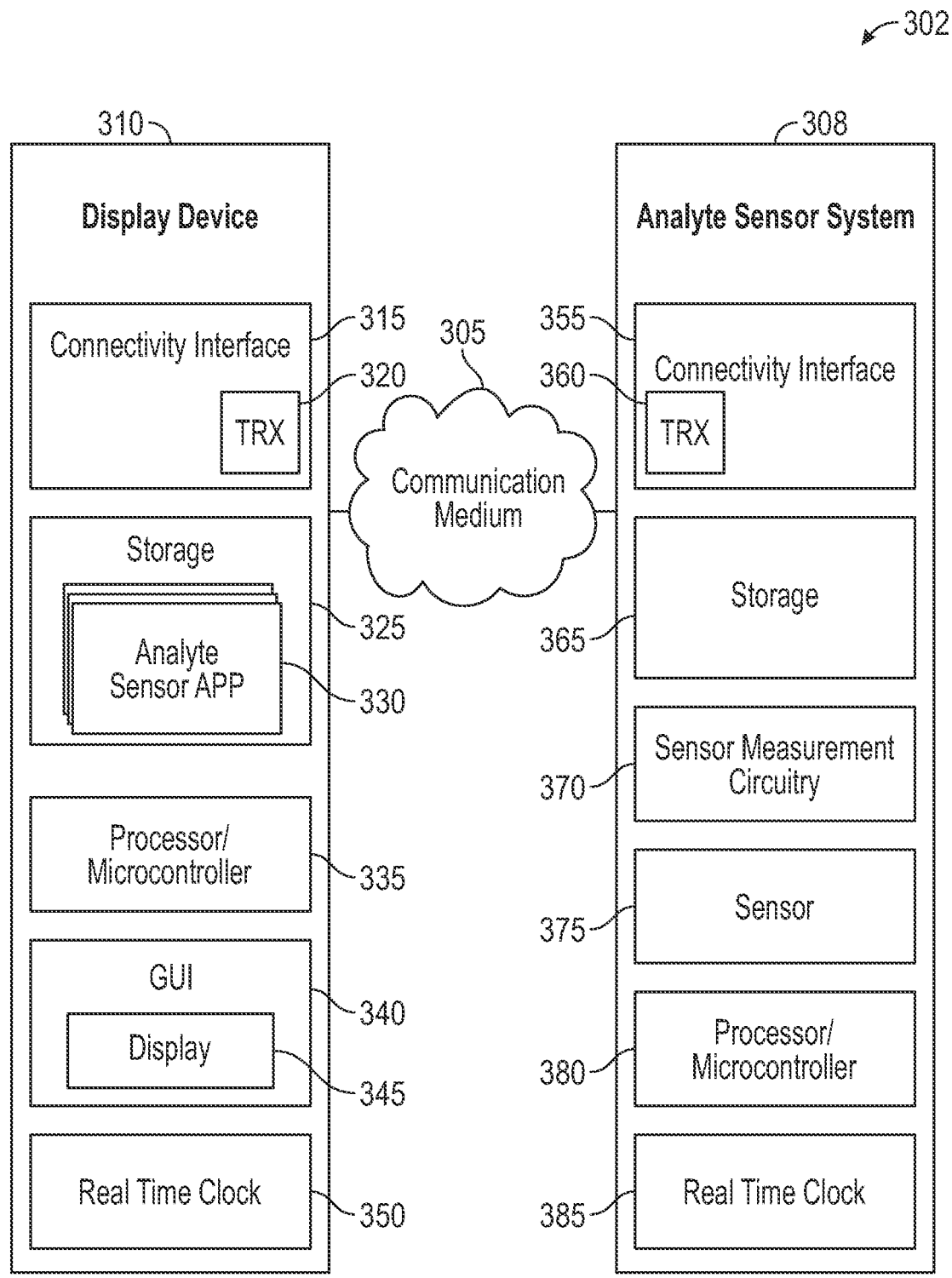

FIG. 3B illustrates an example system 302, which includes examples of a display device and an analyte sensor system that may be used in connection with implementing the wireless communications protocols and techniques described herein. As illustrated in FIG. 3B, system 302 includes analyte sensor system 308. As shown, analyte sensor system 308 may include analyte sensor 375 (e.g., which may also be designated analyte sensor 104 in FIG. 1) coupled to sensor measurement circuitry 370 for processing and managing sensor data. Sensor measurement circuitry 370 may be coupled to processor/microprocessor 380 (hereinafter "processor 380") (e.g., which may be part of the sensor electronics module 106 in FIG. 1). In some embodiments, processor 380 may perform part or all of the functions of the sensor measurement circuitry 370 for obtaining and processing sensor measurement values from analyte sensor 375. Processor 380 may be further coupled to a radio unit or transceiver 360 (e.g., which may be part of the sensor electronics module 106 in FIG. 1) for sending sensor data and receiving requests, commands and/or temporary power from an external device, such as display device 310, which may be used to display or otherwise provide the sensor data (or analyte data) to a user.

As used herein, the terms "radio," "radio unit," "transceiver," "radio transceiver" and "transceiver radio" are used interchangeably and generally refer to a device, circuitry or module that may wirelessly transmit and receive data. In addition, according to some embodiments, transceiver 360 may further comprise an NFC antenna and associated circuitry configured to receive power from another device, e.g., display device 310, via a near field communication, which analyte sensor system 308 may utilized to temporarily power one or more of its components necessary for communicating with another device, for example, in cases where an internal battery of analyte sensor system 308 (not shown) has insufficient power or is otherwise unable to adequately power such components. Analyte sensor system 308 may further include storage 365 (e.g., which may be part of the sensor electronics module 106 in FIG. 1) and real time clock (RTC) 385 (e.g., which may be part of the sensor electronics module 106 in FIG. 1) for storing and tracking sensor data.

As noted, wireless communication protocols may be used to transmit and receive data between analyte sensor system 308 and the display device 310 via communication medium 305. Such wireless protocols may be designed for use in a wireless network that is optimized for periodic and small data transmissions (that may be transmitted at low rates if necessary) to and from multiple devices in a close range (e.g., a personal area network (PAN)). For example, one such protocol may be optimized for periodic data transfers where transceivers may be configured to transmit data for short intervals and then enter low power modes for long intervals. The protocol may have low overhead requirements both for normal data transmissions and for initially setting up communication channels (e.g., by reducing overhead) to reduce power consumption. In some embodiments, burst broadcasting schemes (e.g., one-way communication) may be used. This may eliminate overhead required for acknowledgement signals and allow for periodic transmissions that consume little power. In other embodiments, passive or active proximity-based protocols may be employed to reduce overhead (e.g., overhead associated with typical pairing operations) and/or increase security, with NFC being one specific example.

The protocols may further be configured to establish communication channels with multiple devices while implementing interference avoidance schemes. In some embodiments, the protocol may make use of adaptive isochronous network topologies that define various time slots and frequency bands for communication with several devices. The protocol may thus modify transmission windows and frequencies in response to interference and to support communication with multiple devices. Accordingly, the wireless protocol may use time and frequency division multiplexing (TDMA) based schemes. The wireless protocol may also employ direct sequence spread spectrum (DSSS) and frequency-hopping spread spectrum schemes. Various network topologies may be used to support short-distance and/or low-power wireless communication such as peer-to-peer, start, tree, or mesh network topologies such as Wi-Fi, Bluetooth and BLE. The wireless protocol may operate in various frequency bands such as an open ISM band such as 2.4 GHz. Furthermore, to reduce power usage, the wireless protocol may adaptively configure data rates according to power consumption.

With further reference to FIG. 3B, system 302 includes display device 310 communicatively coupled to analyte sensor system 308 via communication medium 305. The display device 310 includes connectivity interface 315 (which in turn includes transceiver 320), storage 325 (which in turn stores analyte sensor application 330 and/or additional applications), processor/microprocessor 335 (hereinafter "processor 335"), GUI 340 that may be presented using display 345 of display device 310, and RTC 350. A bus (not shown here) may be used to interconnect the various elements of display device 310 and transfer data between these elements.

Display device 310 may be used for alerting and providing sensor information or analyte data to a user and may use processor 335 for processing and managing sensor data. Display device 310 may use display 345, storage 325, analyte sensor application 330, and RTC 350 for displaying, storing, and tracking sensor data. Transceiver 320 may be used for receiving sensor data and for sending requests, instructions, data, and/or power to analyte sensor system 308. Transceiver 320 may further employ a communication protocol. Storage 325 may also be used for storing an operating system for display device 310 and/or a custom (e.g., proprietary) application designed for wireless data communication between a transceiver and display device 310. Storage 325 may be a single memory device or multiple memory devices and may be a volatile or non-volatile memory for storing data and/or executable instructions for software programs and applications. The executable instructions may be executed by processor 335 to control and manage transceiver 320.

In certain embodiments, when a standardized communication protocol is used, commercially available transceiver circuits may be utilized that incorporate processing circuitry to handle low level data communication functions such as the management of data encoding, transmission frequencies, handshake protocols, and the like. In these embodiments, processor 335, 380 does not need to manage these activities, but rather provides desired data values for transmission, and manages high level functions such as power up or down, set a rate at which messages are transmitted, and the like. Instructions and data values for performing these high-level functions may be provided to the transceiver circuits via a data bus and transfer protocol established by the manufacturer of the transceiver 320, 360.

Components of analyte sensor system 308 may require replacement periodically. For example, analyte sensor system 308 may include an implantable analyte sensor 375 that may be attached to a sensor electronics module, e.g., sensor electronics module 106, that includes sensor measurement circuitry 370, processor 380, storage 365, and transceiver 360, and a battery (not shown). Analyte sensor 375 may require periodic replacement (e.g., every 7 to 30 days). The sensor electronics module may be configured to be powered and active for much longer than analyte sensor 375 (e.g., for three to six months or more) until the battery needs replacement. Replacing these components may be difficult and require the assistance of trained personnel. Reducing the need to replace such components, particularly the battery, significantly improves the convenience and cost of using analyte sensor system 308, including to the user. In some embodiments, when a sensor electronic module is used for the first time (or reactivated once a battery has been replaced in some cases), it may be connected to analyte sensor 375 and a sensor session may be established.

As will be further described below, there may be a process for initially establishing communication between display device 310 and the sensor electronics module, e.g., sensor electronics module 106, when the module is first used or re-activated (e.g., the battery is replaced). Once display device 310 and the sensor electronics module have established communication, display device 310 and the sensor electronics module may periodically and/or continuously be in communication over the life of several analyte sensors 375 until, for example, the battery needs to be replaced. Each time an analyte sensor 375 is replaced, a new sensor session may be established. The new sensor session may be initiated through a process completed using display device 310 and the process may be triggered by notifications of a new analyte sensor via the communication between the sensor electronics module and display device 310 that may be persistent across sensor sessions.

Analyte sensor system 308 typically gathers analyte data from analyte sensor 375 and transmits the same to display device 310. Data points regarding analyte values may be gathered and transmitted over the life of analyte sensor 375 (e.g., in the range of 1 to 30 day s or more). New measurements may be transmitted often enough to adequately monitor glucose levels. Rather than having the transmission and receiving circuitry of each of analyte sensor system 308 and display device 310 continuously communicating, analyte sensor system 308 and display device 310 may regularly and/or periodically establish a communication channel between them. Thus, analyte sensor system 308 may in some cases communicate via wireless transmission with display device 310 (e.g., a hand-held computing device, medical device, or proprietary device) at predetermined time intervals. The duration of the predetermined time interval may be selected to be long enough so that analyte sensor system 308 does not consume too much power by transmitting data more frequently than needed, yet frequent enough to provide substantially real-time sensor information (e.g., measured glucose values or analyte data) to display device 310 for output (e.g., via display 345) to a user. While the predetermined time interval is every five minutes in certain embodiments, it is appreciated that this time interval may be varied to be any desired length of time.

With continued reference to FIG. 3B, connectivity interface 315 may interface display device 310 to communication medium 305, such that display device 310 may be communicatively coupled to analyte sensor system 308 via communication medium 305. Transceiver 320 of connectivity interface 315 may include multiple transceiver modules and/or circuitry operable on different wireless standards. Transceiver 320 may be used to receive analyte data and associated commands and messages from analyte sensor system 308. In some embodiments, transceiver 320 may comprise a Bluetooth controller configured to transmit Bluetooth signal for communicating with another device, for example, analyte sensor system 308, as will be described in more detail in connection with one or more embodiments below. Additionally, connectivity interface 315 may in some cases include additional components for controlling radio and/or wired connections, such as baseband and/or Ethernet modems, audio/video codecs, and/or cellular connections and so on.

Storage 325 may include volatile memory (e.g. RAM) and/or non-volatile memory (e.g. flash storage), may include any of EPROM, EEPROM, cache, or may include some combination/variation thereof. In certain embodiments, storage 325 may store user input data and/or other data collected by display device 310 (e.g., input from other users gathered via analyte sensor application 330). Storage 325 may also be used to store volumes of analyte data received from analyte sensor system 308 for later retrieval and use, e.g., for determining trends and triggering alerts. Additionally, storage 325 may store analyte sensor application 330 that, when executed using processor 335, for example, receives input (e.g., by a conventional hard/soft key or a touch screen, voice detection, or other input mechanism), and allows a user to interact with the analyte data and related content via GUI 340.

In certain embodiments, a user may interact with analyte sensor application 330 via GUI 340, which may be provided by display 345 of display device 310. By way of example, display 345 may be a touchscreen display that accepts various hand gestures as inputs. Analyte sensor application 330 may process and/or present analyte-related data received by display device 310, according to various operations described herein, and present such data via display 345. Additionally, analyte sensor application 330 may be used to obtain, access, display, control, and/or interface with analyte data and related messaging and processes associated with analyte sensor system 308.

Analyte sensor application 330 may be downloaded, installed, and initially configured/setup on display device 310. For example, display device 310 may obtain analyte sensor application 330 from a computing system accessed via a communication medium (e.g., communication medium 305), such as an application store or the like. Following installation and setup, analyte sensor application 330 may be used to access and/or interface with analyte data (e.g., whether stored locally from storage 325, from analyte sensor system 308, or from another computing system). By way of illustration, analyte sensor application 330 may present a menu that includes various controls or commands that may be executed in connection with the operating of analyte sensor system 308 and one or more display devices 310. Analyte sensor application 330 may also be used to interface with or control other display devices 310, for example, to deliver or make available thereto analyte data, including for example by receiving/sending analyte data directly to the other display device 310 and/or by sending an instruction for analyte sensor system 308 and the other display device 310 to be connected, etc. Additionally, analyte sensor application 330 in some implementations may interact with one or more additional applications supported by display device 310, for example to retrieve or supply relevant data. Such applications may include, by way of example, fitness/lifestyle monitoring applications, social media applications, and so on. Additionally, analyte sensor application 330 in certain embodiments may be configured to operate according to (or support) one or more wireless communication protocols. The analyte sensor application 330 may use such wireless communication protocol(s) to configure the display device 310 for communications with the analyte sensor system 308. For example, analyte sensor application 330 may include software instructions, including a custom communication profile (as described below), for configuring display device 310 to communicate with analyte sensor system 308 based on instructions provided by the custom profile.

Analyte sensor application 330 may include various code/functional modules, such as, for example, a display module, a menu module, a list module, and so on as will become clear in light of the description of various functionalities herein (e.g., in connection with disclosed methods). These modules may be implemented separately or in combination. Each module may include computer-readable media and have computer-executable code stored thereon, such that the code may be operatively coupled to and/or executed by processor 335 (which, e.g., may include a circuitry for such execution) to perform specific functions (e.g., as described herein with regard to various operations and flow charts etc.) with respect to interfacing with analyte data and performing tasks related thereto. As will be further described below, a display module may present (e.g., via display 345) various screens to a user, with the screens containing graphical representations of information provided by analyte sensor application 330. In further embodiments, analyte sensor application 330 may be used to display to the user an environment for viewing and interacting with various display devices that may be connectable to analyte sensor system 308, as well as with analyte sensor system 308 itself. Analyte sensor application 330 may include a native application modified with a software design kit (or software development kit) (SDK) (e.g., depending on the operating system) in order to carry out the functionalities/features described herein.

Continuing with FIG. 3B, processor 335 may include processor sub-modules, including, by way of example, an applications processor that interfaces with and/or controls other elements of display device 310 (e.g., connectivity interface 315, analyte sensor application 330, GUI 340, display 345, RTC 350, etc.). Processor 335 may include a controller and/or microcontroller that provides various controls (e.g., interfaces with buttons and switches) related to device management, such as, for example, lists of available or previously paired devices, information related to measurement values, information related to network conditions (e.g., link quality and the like), information related to the timing, type, and/or structure of messaging exchanged between analyte sensor system 308 and display device 310, and so on. Additionally, the controller may include various controls related to the gathering of user input, such as, for example, a user's finger print (e.g., to authorize the user's access to data or to be used for authorization/encryption of data, including analyte data), as well as analyte data.

Processor 335 may include circuitry such as logic circuits, memory, a battery and power circuitry, and other circuitry drivers for periphery components and audio components. Processor 335 and any sub-processors thereof may include logic circuits for receiving, processing, and/or storing data received and/or input to display device 310, and data to be transmitted or delivered by display device 310. Processor 335 may be coupled by a bus to display 345 as well as connectivity interface 315 and storage 325 (including analyte sensor application 330). Hence, processor 335 may receive and process electrical signals generated by these respective elements and thus perform various functions. By way of example, processor 335 may access stored content from storage 325 at the direction of analyte sensor application 330 and process the stored content for display and/or output by display 345. Additionally, processor 335 may process the stored content for transmission via connectivity interface 315 and communication medium 305 to other display devices 310, analyte sensor system 308, or server system 334. Display device 310 may include other peripheral components not shown in detail in FIG. 3B.

It should be noted at this juncture that like-named elements as between display device 310 and analyte sensor system 308 may include similar features, structures, and/or capabilities. Therefore, with respect to such elements, the description of display device 310 above may in some cases be applied to analyte sensor system 308.

Example Authentication and Pairing

Establishing a secure wireless connection between analyte sensor system 308 and display device 310 may involve engaging in identification, authentication, pairing, and/or bonding protocols or methods. Identification protocols may be designed, for example, to allow display device 310 to effectively identify the analyte sensor system 308. Authentication protocols may be designed to allow the analyte sensor system 308 and display device 310 to verify whether the other peer device is a trusted device. Pairing and bonding protocols may be designed to allow for the exchange of information between the analyte sensor system 308 and display device 310 to establish an encrypted connection for communication.

Figure 4:
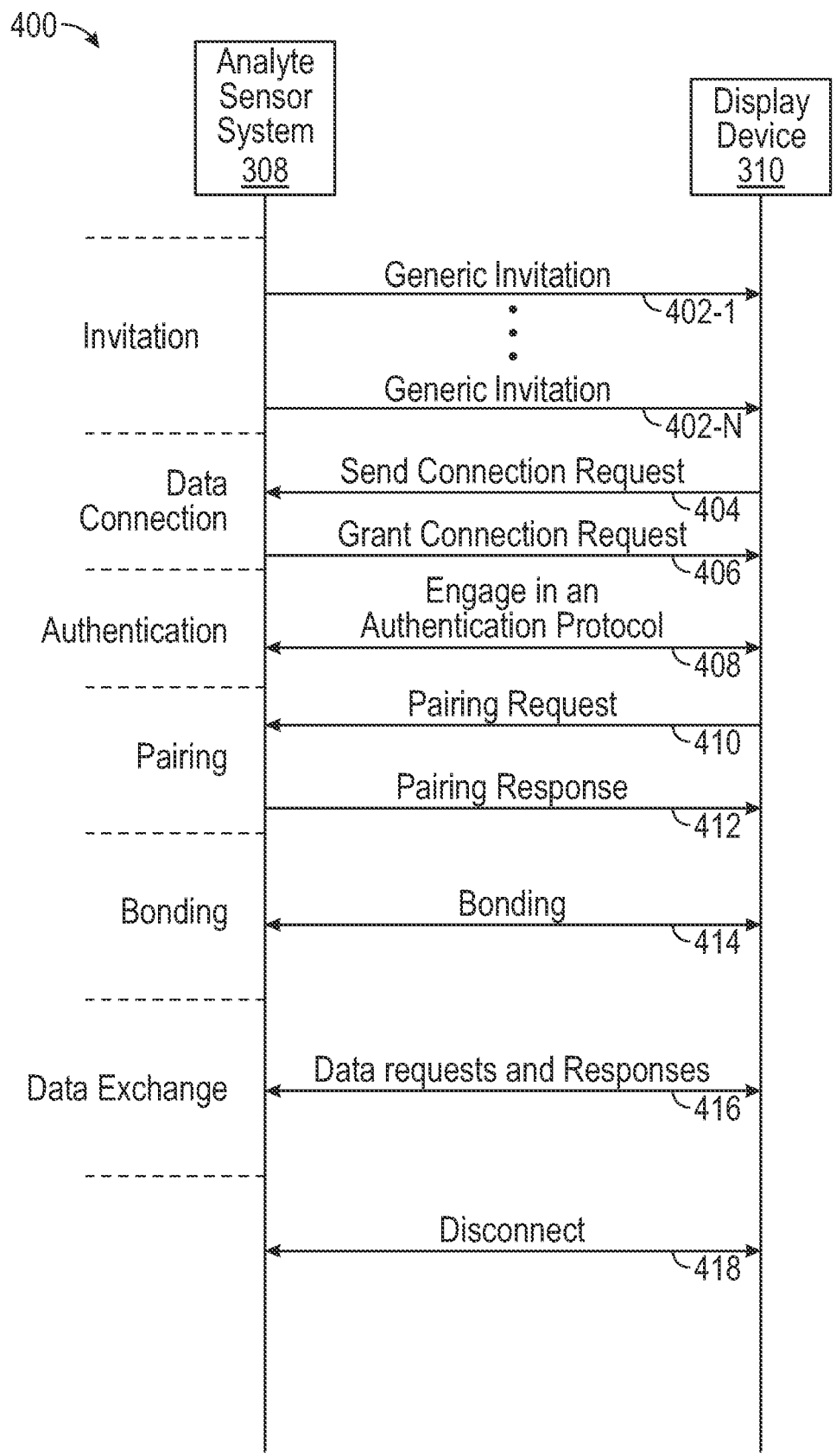
FIG. 4 is a network sequence diagram illustrating execution of a communication procedure between an analyte sensor system and a display device, according to certain embodiments disclosed herein.

FIG. 4 is a network sequence diagram 400 illustrating execution of a communication procedure between an analyte sensor system 308 and a display device 310, according to certain embodiments. In certain embodiments, the communication procedure may include invitation, authentication, pairing, and/or bonding between the analyte sensor system 308 and the display device 310.

The various tasks performed in connection with the procedures illustrated in FIG. 4 may be performed, for example, by respective processors executing instructions embodied in respective non-transitory computer-readable media. The tasks or operations performed in connection with the procedures may be performed by hardware, software, firmware, or any combination thereof incorporated into one or more of computing devices. It will be appreciated upon studying the present disclosure that such procedures may include any number of additional or alternative tasks or operations. Note that some of the steps illustrated in FIG. 4 may be performed in a different order than illustrated in FIG. 4 or may be performed in parallel or overlap in time. Accordingly, the reference numbers assigned to the different steps illustrated in FIG. 4 may not be indicative of the order in which they are performed, in certain embodiments. Additionally, the procedures may be incorporated into more comprehensive procedures or processes having additional functionality not described in detail herein with specific reference to FIG. 4.

Also, while network sequence diagram 400 illustrates the execution of communication procedures for wireless communications between analyte sensor system 308 and display device 310, steps illustrated in network sequence diagram 400 may be similarly followed when establishing wireless communication between analyte sensor system 308 and one of a variety of other devices (e.g., a router, a hub, or any other computing device). In certain embodiments, network sequence diagram 400 illustrates communication procedures for an initial connection between analyte sensor system 308 and a first display device 310. That is, in certain embodiments, the steps of network sequence diagram 400 may be performed when analyte sensor system 308 has not yet paired with any display devices.

In FIG. 4, prior to performing authentication, pairing, and bonding, analyte sensor system 308 may be configured to send invitations to display devices, such as display device 310 depicted in FIG. 4, that are available for connection. This may be performed, for example, by transmitting generic invitations, as shown in step(s) 402 1-N of FIG. 4. Step(s) 402 1-N may be performed as part of an "invitation phase." In certain embodiments, the display device 310 may scan for analyte sensor system 308 or another like sensor system to connect to. Scanning for analyte sensor system 308 generally entails receiving and processing invitation messages that are being broadcast by analyte sensor system 308.

Generally, when analyte sensor system 308 (or its sensor electronics module 106) is first activated, in order to be identified by and pair with one or more display devices, analyte sensor system 308 is configured to broadcast generic invitations. In the embodiments of FIG. 4, at step(s) 402 1-N, analyte sensor system 308 broadcasts generic invitation(s). A generic invitation may be broadcast over multiple frequency channels. Analyte sensor system 308 may broadcast the generic invitation periodically at defined intervals. In certain embodiments, analyte sensor system 308 broadcasts the generic invitation as soon as analyte sensor system 308 is powered on.

The generic invitation packet may include a header (e.g., a 2-byte header) and a variable size payload (e.g., 6-37 bytes). The header may include one or more fields, including, for example, a PDU Type field, one or more reserved fields, etc. The payload may include an invitation address (e.g., a 48-bit BLE MAC address or a Generic Address Profile (GAP) address of analyte sensor system 308) and one or more invitation data structures, described in more detail below.

After detecting the generic invitation, display device 310, at step 404, may respond to the generic invitation by sending a connection request to analyte sensor system 308. Upon receiving the connection request, analyte sensor system 308 may accept, deny, or simply ignore the request. If there are no grounds for denying or ignoring a connection request, analyte sensor system 308 may accept the request and connect to the display device that sent the request. As shown at step 406, for example, analyte sensor system 308 sends a connection response message to display device 310 indicating the request is granted. Then, a data connection between analyte sensor system 308 and display device 310 may be established.

In certain embodiments, after a data connection is established between analyte sensor system 308 and display device 310, an authentication procedure may be employed before data (e.g., analyte data) is actually exchanged (e.g., at step 416). For example, at step 408, analyte sensor system 308 and display device 310 perform authentication during an authentication phase. The authentication may be performed according to an authentication protocol, examples of which may include, a challenge-response protocol, a certificate-based protocol, token authentication, public key infrastructure (PKI) protocols, password authenticated key exchange (PAKE) protocols, and the like.

After the authentication phase, analyte sensor system 308 and display device 310 may perform pairing and bonding. Steps 410, 412, and/or 414 may be performed as part of the "pairing and bonding phase". At step 410, display device 310 may send a pairing request to analyte sensor system 308 and, at step 412, analyte sensor system 308 may respond with a pairing response. In some examples, the pairing process involves the exchange of information, such as information relating to Input/Output (IO) capabilities, Man-In-The-Middle (MITM) protection, etc. During the pairing between analyte sensor system 308 and display device 310, the two devices may agree on a temporary key (TK), whose value may depend on the pairing method that is used.

At step 414, analyte sensor system 308 and display device 310 engage in bonding. During bonding, the devices may store additional information about each other. For example, after the exchange of security features and the encryption of the connection during pairing, the devices bond by generating and exchanging a long term key (LTK) and storing the LTK for later use.

After bonding with display device 310, analyte sensor system 308 may add display device 310 to a targeted device list. A targeted device list may be a data array or some other data structure maintained in memory by analyte sensor system 308 and may include devices with which analyte sensor system 308 has previously paired and bonded. By adding display device 310 to a targeted device list, analyte sensor system 308 and display device 310 may more quickly reconnect for subsequent connections. For example, certain authentication and pairing and bonding steps may be skipped for reconnections as described in more detail with respect to FIG. 5.

After pairing and bonding, analyte sensor system 308 and display device 310 are ready to exchange data over a secure connection. For example, analyte sensor system 308 may encrypt data (e.g., at the BLE layer), including analyte measurements associated with the user, for transmission to display device 310 at step 424 using the LTK. Display device 310 may similarly encrypt data for transmission to analyte sensor system 308 using the LTK.

As mentioned previously, analyte sensor system 308 gathers analyte data and transmits the same or a modified version of the collected data to display device 310. Data points regarding analyte values may be gathered and transmitted over the life of analyte sensor 104 (e.g., in the range of 1 to 30 days or more). New measurements may be transmitted often enough to adequately monitor analyte levels of a user of analyte sensor system 308. In certain embodiments, for power savings, rather than having the transmission and receiving circuitry of each of analyte sensor system 308 and display device 310 continuously communicate, analyte sensor system 308 and display device 310 may regularly and/or periodically establish a communication channel among each other.

Thus, in such embodiments, analyte sensor system 308 may, for example, communicate with display device 310 at predetermined time intervals (e.g., by switching between a sleep mode and an operational mode periodically). The duration of the predetermined time interval may be selected to be long enough so that analyte sensor system 308 does not consume too much power by transmitting data more frequently than needed, yet frequent enough to provide substantially real-time sensor information (e.g., measured glucose values or analyte data) to the display device for output to the user. This time interval may be varied to be any desired length of time. For example, in certain embodiments, analyte sensor system 308 may "wake up" every few minutes (e.g., five minutes) to exchange data with display device 310 but go into a sleep mode in-between the intervals. Each time analyte sensor system 308 "wakes up", analyte sensor system 308 and display device 310 may perform connection procedures for re-establishing a secure wireless connection between the two devices. In other embodiments, analyte sensor system 308 and display device 310 may be continuously communicating. For example, in certain embodiments, analyte sensor system 308 and display device 310 may establish a session or connection there between and continue to communicate together until the connection is lost.

In the embodiments of FIG. 4, analyte sensor system 308 is configured to go into sleep mode subsequent to pairing, bonding, and exchanging data with display device 310. Accordingly, at step 418, analyte sensor system 308 and display device 310 disconnect.

As described above, after bonding with display device 310, analyte sensor system 308 adds information (e.g., GAP address) about display device 310 to a targeted device list for reconnections. In certain embodiments, a threshold may be configured for the targeted device list. A targeted device list threshold may be used by analyte sensor system 308 to determine whether to continue generic invitations after disconnecting with display device 310 or during subsequent invitation sessions (e.g., every 5 minutes) when analyte sensor system 308 wakes up. For example, analyte sensor system 308 may have a single targeted device list and a corresponding threshold of one (1), meaning that analyte sensor system 308 is configured to connect with only one device at a time. In such an example, if analyte sensor system 308 is configured to perform generic invitations for 2 seconds when it is first activated, analyte sensor system 308 may determine to stop broadcasting generic invitations, once it has paired and bonded with display device 310, for the remainder of the first 2 second generic invitation session and/or during next invitation sessions (e.g., every 5 minutes). In such an example, analyte sensor system 308 will only perform targeted invitations during the next invitation sessions to reconnect with display device 310, as further described in relation to FIG. 5.

In certain embodiments, analyte sensor system 308 may be configured with multiple targeted device lists, each with a corresponding configured threshold. In such embodiments, each targeted device list may be associated with a different type of device. For example, analyte sensor system 308 may have a first targeted device list for commercial display devices (e.g., display device 112 in FIG. 1) and a second targeted device list for medical devices, such as an insulin pump (e.g., medical device 110 in FIG. 1). In the example above, analyte sensor system 308's first targeted device list threshold for commercial display devices may be one (1) (or some other number) and the second targeted device list threshold for medical devices may also be one (1) (or some other number).

In such an example, assuming display device 310 is a commercial display device, after pairing and bonding with display device 310, analyte sensor system 308 may determine that analyte sensor system 308's targeted device list threshold for commercial display devices has been met. However, in this example, because analyte sensor system 308's threshold for its second targeted device list is not met yet, analyte sensor system 308 may continue sending additional generic invitations for additional devices to pair with analyte sensor system 308. Where analyte sensor system 308 determines that both target device list thresholds have been met, analyte sensor system 308 stops broadcasting generic invitations and will only broadcast targeted invitations going forward, as shown in FIG. 5.

In certain embodiments, analyte sensor system 308 has configured periods for sending targeted invitations and configured periods for sending generic invitations. For example, during an invitation session (or invitation period) where analyte sensor system 308 performs both generic invitation and targeted invitation, analyte sensor system 308 may broadcast generic invitation for a first length of time (e.g., 2 seconds) and spend a second length of time (e.g., 20 seconds) broadcasting targeted invitations.

As noted, once the one or more targeted device list thresholds have been met, analyte sensor system 308 may stop sending generic invitations and may only send targeted invitations for reconnection to one or more devices that previously paired with analyte sensor system 308. FIG. 5 is a network sequence diagram 500 illustrating the execution of communication procedure between an analyte sensor system 308 and a display device 310, according to certain embodiments. In certain embodiments, the communication procedure may be for reestablishing communications between the analyte sensor system 308 and a display device 310, according to certain embodiments. Note that although network sequence diagram 500 depicts a communication procedure in which targeted invitation(s) are sent to a display device 310, in certain embodiments, generic invitations(s) may also be sent to the display device 310, e.g., in cases where at least one targeted device list threshold is unmet.

Figure 5:
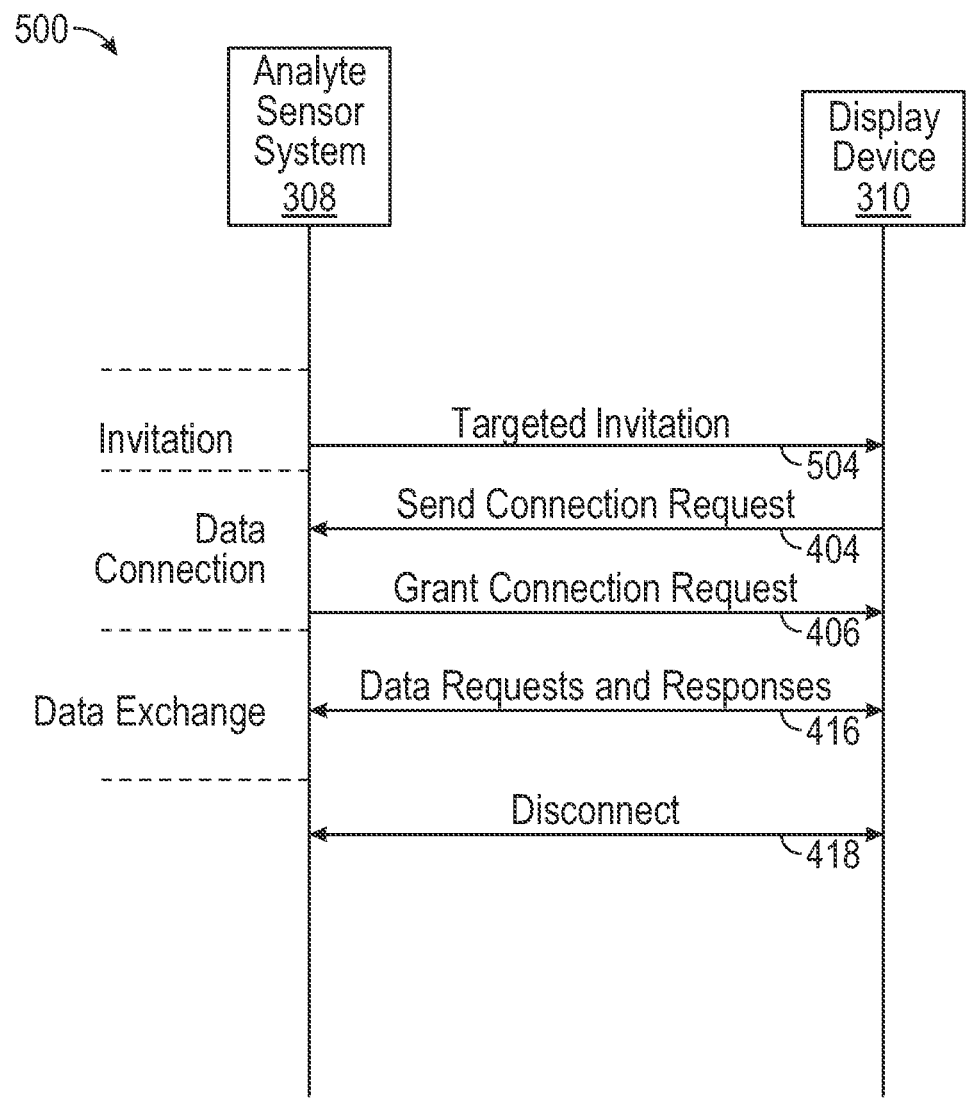
FIG. 5 is another network sequence diagram illustrating execution of a communication procedure between an analyte sensor system and a display device, according to certain embodiments disclosed herein.
Figure 6:
FIG. 6 illustrates a table that includes example invitation packet sizes, according to certain embodiments disclosed herein.

The various tasks performed in connection with the procedures illustrated in FIG. 5 may be performed, for example, by respective processors executing instructions embodied in respective non-transitory computer-readable media. The tasks or operations performed in connection with the procedures may be performed by hardware, software, firmware, or any combination thereof incorporated into one or more of computing devices. It will be appreciated upon studying the present disclosure that such procedures may include any number of additional or alternative tasks or operations. Note that some of the steps illustrated in FIG. 5 may be performed in a different order than illustrated in FIG. 5 or may be performed in parallel or overlap in time. Accordingly, the reference numbers assigned to the different steps illustrated in FIG. 5 may not be indicative of the order in which they are performed, in certain embodiments. Additionally, the procedures may be incorporated into more comprehensive procedures or processes having additional functionality not described in detail herein with specific reference to FIG. 5.

At 504, analyte sensor system 308 broadcasts one or more targeted invitations. Each targeted invitation may include a same or similar packet format as a generic invitation. For example, each targeted invitation may include a header (e.g., 2-byte header) and a variable size payload (e.g., 6-37 bytes). The payload of a targeted invitation may include the invitation address (e.g., 48-bit BLE MAC address or GAP address of analyte sensor system 308), intended recipient address (e.g., address of the previously connected display device 310), and one or more invitation data structures, described in more detail below.

At step 404, display device 310 sends a connection request to analyte sensor system 308. At step 406, analyte sensor system 308 grants the connection request based on determining that display device 310 has previously paired with analyte sensor system 308 and appears on analyte sensor system 308's targeted device list. In certain embodiments, authentication and pairing and bonding steps may be skipped because display device 310 previously paired with analyte sensor system 308. After connecting, analyte sensor system 308 and display device 310 may exchange data (at step 416), and subsequently disconnect at step 418.

With the above description of aspects of systems and methods for wireless communication of analyte data, a number of specific and further improvements will now be provided. It will be appreciated by one of skill in the art upon studying the present disclosure that these improvements may be implemented using features and combinations of features of the example configurations described above, whether or not explicit reference is made to the same.

Example Techniques for Inviting to Wirelessly Connect with Reduced Payload

As noted, one technical deficiency with certain existing connection procedures, such as the procedures of network sequence diagrams 400 and 500 illustrated in FIGS. 4 and 5, respectively, is that such procedures may cause the analyte sensor system 308 to transmit messages, such as invitation packets (e.g., advertisement packets), with a high overhead. By way of example, as noted above, an invitation may be in the form of a packet (e.g., a protocol data unit (PDU)), which includes a header (e.g., a 2-byte header) and a variable size payload (e.g., 6-37 bytes).

In some cases, when broadcasting generic invitations and targeted invitations, the analyte sensor system 308 may include various types of data within the payload portions of the generic and targeted invitation packets. However, while the display device 310 may be configured to parse and use the full content (including the payload) of the generic invitations during generic inviting (e.g., when the display device 310 is attempting to initially pair with the analyte sensor system 308), the display device 310 may not need the full content (including the payload) of the targeted invitations during targeted inviting (e.g., when the analyte sensor system 308 is attempting to reconnect with the display device 310). Rather, during targeted inviting, the display device 310 may merely examine the invitation address (e.g., GAP address) of the targeted invitation (e.g., in the payload of the PDU) and determine whether the invitation address is the same as the invitation address of the analyte sensor system 308 that the display device 310 previously paired and bonded with. If the display device 310 determines that the invitation address is the same as the invitation address of the analyte sensor system 308 that the display device 310 previously paired and bonded with, then the display device 310 may send a connection request to the analyte sensor system 308 and may not have to parse a remaining portion of the payload of the invitation. In such instances, including a full payload within the targeted invitations may lead to resource inefficiencies, such as increased or unnecessary overhead, resulting in unnecessary power consumption at the analyte sensor system 308.

To address the resource inefficiency discussed above, certain embodiments described herein provide techniques for reducing the payload of certain invitation messages based on whether the analyte sensor system 308 is in pairing mode (e.g., generic invitation period) or reconnection mode (e.g., targeted invitation period). In certain embodiments, the analyte sensor system 308 may determine whether to use a reduced payload within an invitation message, based on a status of one or more targeted device lists associated with the analyte sensor system 308. As shown in table 600 of FIG. 6, for example, when the analyte sensor system 308 is not connected to any display devices (e.g., one or more targeted device list thresholds are not met), the analyte sensor system 308 may broadcast generic invitations with a first payload size during a generic invitation period, and once the generic invitation period has elapsed, the analyte sensor system 308 may transmit targeted invitations with a second payload size (smaller than the first payload size) during a targeted invitation period. In certain embodiments, the first payload size may be a full payload size (e.g., 37 bytes) and may include an invitation address (e.g., 6-byte GAP address) and one or more invitation data structures (e.g., up to 31 bytes). Examples of invitation data structures may include, but are not limited to, a universally unique identifier (UUID) of services provided by the analyte sensor system 308, a service class UUID, a shortened local name, a complete local name, etc. The shortened local name may include a subset of characters from the complete local name. For example, if the complete local name is "Device_Name," then the shortened local name may be "Device" or "Devi- ce_N" or some other subset of "Device_Name." An exemplary full payload for an invitation message may include a GAP address, GAP flags, a complete local name, a service UUID, and manufacturer specific data.

As also shown in table 600, when the analyte sensor system 308 has one or more targeted device lists whose corresponding threshold(s) have not been met, the analyte sensor system 308 may broadcast generic invitations with a first payload size during a generic invitation period, and once the generic invitation period has elapsed, the analyte sensor system 308 may transmit targeted invitations with a second payload size (smaller than the first payload size) during a whitelist advertising period.

As further shown in table 600, when threshold(s) of all of the analyte sensor system 308's targeted device list(s) have been met, the analyte sensor system 308 may refrain from transmitting generic invitations and may transmit targeted invitations with a reduced payload size (e.g., compared to a payload size of a previously transmitted generic invitation).

Figure 7:
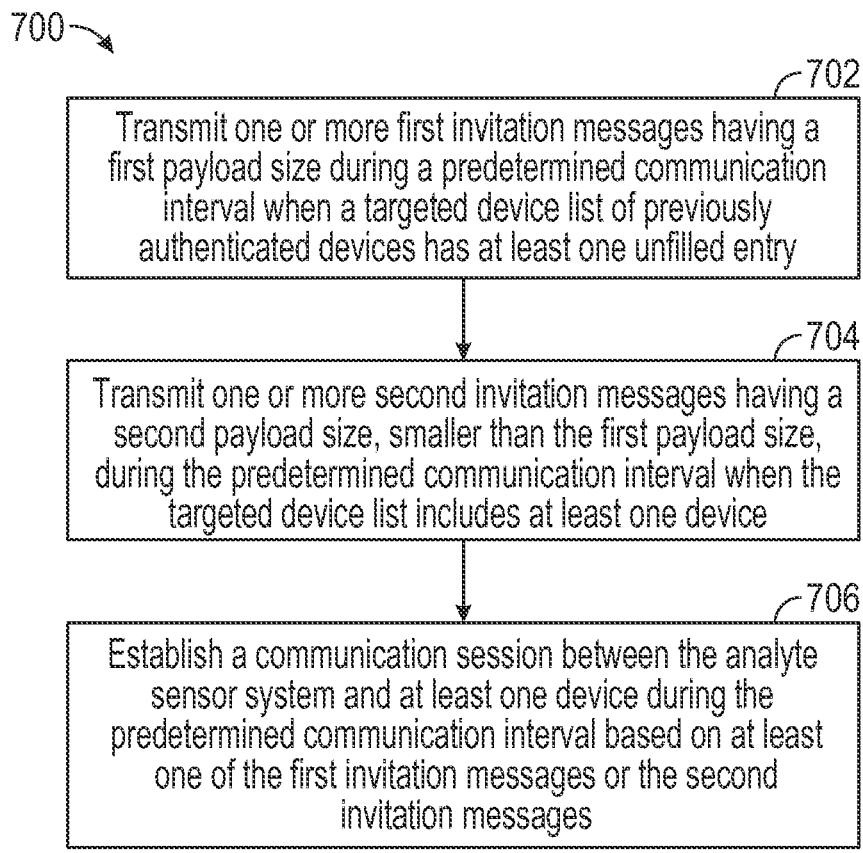
FIG. 7 is a flow diagram illustrating example operations for wireless communication, according to certain embodiments disclosed herein.

FIG. 7 is a flow diagram illustrating example operations 700 for wireless communication, for example, for reducing the payload of certain invitation messages, according to certain embodiments disclosed herein. The operations 700 may be performed by an analyte sensor system (e.g., analyte sensor system 308).

At operation 702, the analyte sensor system 308 transmits one or more first invitation messages (e.g., generic invitations) having a first payload size during a first predetermined communication interval when a targeted device list of previously authenticated devices has at least one unfilled entry (e.g., at least one targeted device list threshold is not met). Each first invitation message may include a header portion and a payload portion. Further, the payload portion of each first invitation message may have a first payload size.

In certain embodiments, operation 702 may be performed when the analyte sensor system 308 is in the generic invitation phase of an advertising or invitation period. For example, when the targeted device list of the analyte sensor system 308 has at least one unfilled entry, the analyte sensor system 308 may perform generic invitation for up to a first length of time (e.g., 2 seconds) of the invitation period (e.g., 22 seconds). In certain embodiments, the first payload size may be a full payload size for a generic invitation (e.g., a maximum payload size of an invitation PDU).

At operation 704, the analyte sensor system 308 transmits one or more second invitation messages having a second payload size, smaller than the first payload size, during the first predetermined communication interval when the targeted device list of the analyte sensor system 308 includes at least one device, such as display device 310. Each second invitation message may include a header portion and a payload portion. Further, the payload portion of each second invitation message may have a second payload size, which is smaller than the first payload size, as noted above.

In certain embodiments, operation 704 may be performed when the analyte sensor system 308 is in the targeted invitation portion of the invitation period. For example, when the targeted device list includes at least one device, the analyte sensor system 308 may perform targeted invitation for up to a second length of time (e.g., 20 seconds) of the invitation period. In certain embodiments, the one or more second invitation messages may include a GAP address of the analyte sensor system 308 but may not include payload content. In contrast, in certain embodiments, the one or more first invitation messages may include a GAP address of the analyte sensor system 308 and payload content (e.g., analyte data). The second invitation messages may be transmitted after the first invitation messages.

At operation 706, the analyte sensor system 308 establishes a communication session between the analyte sensor system 308 and at least one device during the first predetermined communication interval, based on at least one of the first invitation messages or the second invitation messages. In certain embodiments, the communication session may be an initial communication session established between the analyte sensor system 308 and the at least one device, based on the first invitation messages. In certain embodiments, the communication session may be a reestablished (or subsequent) communication session between the analyte sensor system 308 and the at least one device, based on the second invitation messages.

Example Techniques for Dynamic Transmit Power Adjustment

As noted above, another technical deficiency with certain existing connection procedures, such as the procedures of network sequence diagrams 400 and 500 illustrated in FIGS. 4 and 5, respectively, is that such procedures may cause the analyte sensor system 308 to transmit messages (e.g., packets) at a constant power level regardless of a strength of response signals received from the display device. By way of a non-limiting example, after a connection is made as a result of generic invitations or targeted invitations, the analyte sensor system 308 may transmit packets (e.g., authentication messages, pairing messages, bonding messages, sensor data, etc.) using the same transmission power level, irrespective of the signal strength of the response messages from a display device, such as display device 310. Transmitting packets in this manner may lead to increased or unnecessary power consumption at the analyte sensor system 308. For example, when a patient's analyte sensor system is in close proximity to a display device (e.g., the patient may be holding the display device, the patient may be sleeping next to the display device, etc.), it may be unnecessary to use a same constant power level to transmit packets compared to when the patient's analyte sensor system is further away from the display device or has a poor connection with the display device (e.g., the patient may be sleeping on the transmitter of the analyte sensor system).

Accordingly, certain embodiments described herein provide techniques for dynamically adjusting the transmission power of packets based on a signal strength (e.g., receive signal strength indicator (RSSI)) of the display device 310. More specifically, in certain embodiments, for each packet received from the display device 310 (e.g., on a packet-by-packet basis), the analyte sensor system 308 may determine whether to maintain the transmission power at a current transmission power level, increase the transmission power, or reduce the transmission power, based at least in part on a signal strength of the received packet. For example, when the analyte sensor system 308 receives a packet from the display device 310 with a signal strength lower than a threshold, the analyte sensor system 308 may increase its transmission power by a predetermined amount. Subsequently, as the analyte sensor system 308 receives packets with a signal strength greater than a threshold, the analyte sensor system 308 may reduce its transmission power by a predetermined amount. By dynamically adjusting the transmission power of packets in this manner, power consumption at the analyte sensor system 308 may be reduced based on current quality of the connection (e.g., as inferred by signal strength) between the analyte sensor system 308 and the display device 310. For example, assuming a patient is sleeping on (e.g., the TRX 360 of) the patient's analyte sensor system 308 at a first moment in time, the analyte sensor system 308 may increase its transmission power by a predetermined amount. Subsequently, if the patient changes position/orientation such that the (TRX 360 of the) patient's analyte sensor system 308 has a substantial line-of-sight to the display device 310 at a second moment in time, then the analyte sensor system 308 may reduce its transmission power by a predetermined amount in order to reduce power consumption at the analyte sensor system 308.

Additionally, dynamically adjusting the transmission power of packets may allow for more reliable communication between the analyte sensor system 308 and the display device 310. For example, if the analyte sensor system 308 starts transmitting packet(s) at a first transmission power level (e.g., 0 decibels per milliwatt (dBm)) and determines that the signal strength of a packet received from the display device 310 is less than a threshold, the analyte sensor system 308 may increase the transmission power, which in turn, may increase the likelihood of the display device 310 receiving subsequent packets from the analyte sensor system 308. Continuing with the above example, if at a subsequent third moment in time, the patient moves to a different location, such that the (TRX 360 of the) patient's analyte sensor system 308 is located a large distance away from the display device 310, the analyte sensor system 308 may increase the transmission power to increase the likelihood of the display device 310 receiving subsequent packets from the analyte sensor system 308.

Figure 8:
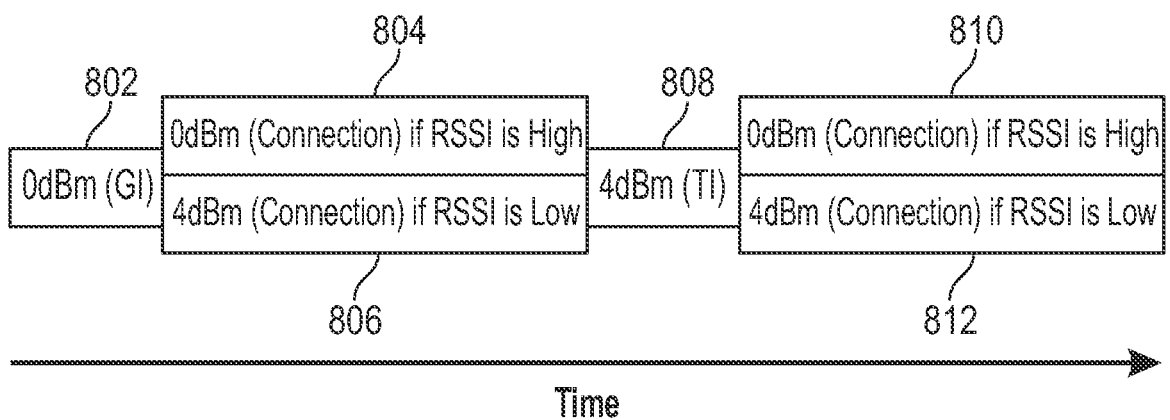
FIG. 8 illustrates an example of dynamic transmission power adjustment, according to certain embodiments disclosed herein.

FIG. 8 illustrates an example of dynamic transmission power adjustment, according to certain embodiments. As shown at 802, the analyte sensor system 308 may begin transmitting generic invitations at a first transmission power level (e.g., 0 dBm) during a generic invitation period. As noted, in certain embodiments, the analyte sensor system 308 may begin transmitting generic invitations when the analyte sensor system 308 is initially activated and has not connected with any display device 310.

After the analyte sensor system 308 has connected with the display device 310 based on transmitting one or more generic invitations, the analyte sensor system 308 may exchange one or more messages with the display device 310. In certain embodiments, these messages may be associated with authentication, pairing, bonding, and/or secure data exchange. For each message received from the display device 310, the analyte sensor system 308 may measure a signal strength (e.g., an RSSI value measured in dBm) of the message and determine whether the signal strength is less than a first threshold (e.g., −80 dBm).

If the signal strength is less than the first threshold, then the analyte sensor system 308 may increase its transmission power at 806 from the first transmission power level (e.g., 0 dBm) to a second transmission power level (e.g., 4 dBm). As a non-limiting example, the transmission power may be increased from the first transmission power level to the second transmission power level when at least one of (i) the analyte sensor system 308 is currently located a large distance away from the display device 310 or (ii) the analyte sensor system 308 does not have a substantial line-of-sight to the display device 310 (e.g., the patient may be sleeping on the transmitter of the analyte sensor system 308).

Alternatively, if the signal strength is greater than or equal to the first threshold, then the analyte sensor system 308 may maintain its transmission power at the first transmission power level (e.g., 0 dBm), as shown at 804. As a non-limiting example, the transmission power may be maintained at the first transmission power level when the analyte sensor system 308 is at least one of (i) currently in close proximity with the display device 310 or (ii) has a substantial line-of-sight to the display device 310.

Once the generic invitation period has elapsed, the analyte sensor system 308 may begin transmitting targeted invitations at a second transmission power level (e.g., 4 dBm) during a targeted invitation period, as shown at 808 in FIG. 8. In certain cases, the analyte sensor system 308 may transmit targeted invitations at a second transmission power level (e.g., 4 dBm) that is higher than the first transmission power level (e.g., 0 dBm) to increase a likelihood of the previously connected display device 310 receiving the targeted invitation. Once a connection is made with the display device 310 as a result of a targeted invitation, the analyte sensor system 308 may exchange one or more messages with the display device 310. For each message received from the display device 310, the analyte sensor system 308 may measure a signal strength of the packet and determine whether the signal strength is greater than a second threshold (e.g., −70 dBm).

If the signal strength is greater than the second threshold, then the analyte sensor system 308 may reduce its transmission power at 812 from the second transmission power level (e.g., 4 dBm) to the first transmission power level (e.g., 0 dBm). As a non-limiting example, the analyte sensor system 308 may reduce the transmission power from the second transmission power level to the first transmission power level when at least one of (i) the analyte sensor system 308 is currently in close proximity to the display device 310 or (ii) the analyte sensor system 308 has a substantial line-of-sight to the display device 310, as it may be unnecessary to maintain the transmission power at the higher second transmission power in these scenarios. Alternatively, if the signal strength is less than or equal to the second threshold, then the analyte sensor system 308 may maintain its transmission power at the second transmission power level (e.g., 4 dBm), as shown at 810. As a non-limiting example, the analyte sensor system 308 may maintain its transmission power at the second transmission power level when at least one of (i) the analyte sensor system 308 is currently located a large distance away from the display device 310 or (ii) the analyte sensor system 308 does not currently have a substantial line-of-sight to the display device 310 (e.g., the patient may be sleeping on the transmitter of the analyte sensor system 308).

Figure 9:
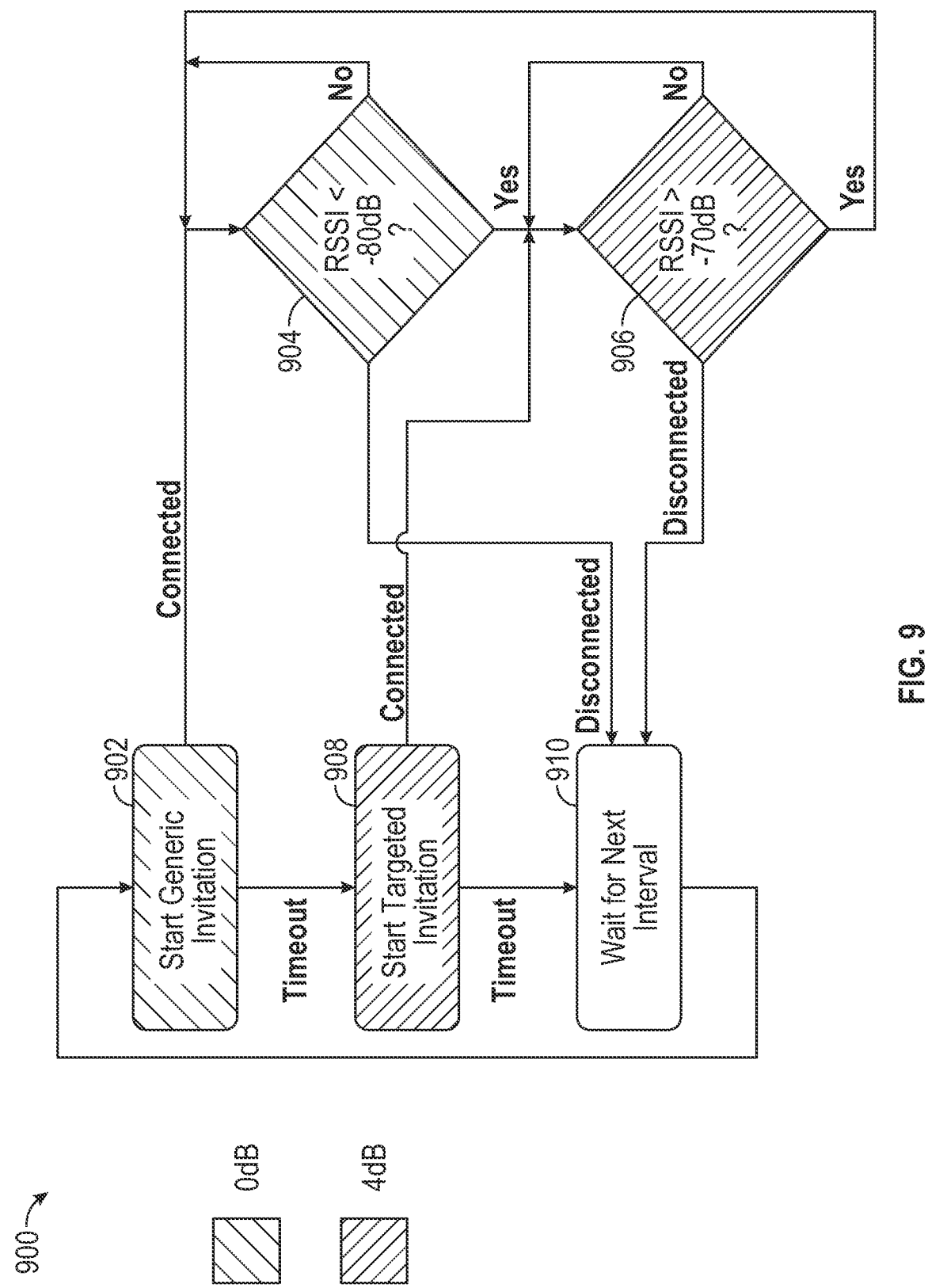
FIG. 9 is a flowchart of example operations for dynamically adjusting the transmission power associated with communications between an analyte sensor system and a display device, according to certain embodiments disclosed herein.

FIG. 9 is a flowchart of example operations 900 for dynamically adjusting the transmission power of invitations based on a signal strength of message(s) from a display device (e.g., display device 310), according to certain embodiments. The operations 900 may be performed by an analyte sensor system (e.g., analyte sensor system 308).

As shown, operations 900 may begin at 902 where the analyte sensor system 308 starts transmitting generic invitations for a generic invitation period using a first transmission power level (e.g., 0 dBm). If the generic invitation period elapses (or timeouts), then the analyte sensor system 308 starts transmitting targeted invitations for a targeted invitation period using a second transmission power level (e.g., 4 dBm), at 908. If the targeted invitation period elapses (or timeouts), then, as shown at 910, the analyte sensor system 308 waits for a next invitation period (or interval) before proceeding back to 902.

If, at 902, the analyte sensor system 308 connects with the display device 310 as a result of a generic invitation, then, at 904, the analyte sensor system determines, for each packet received from the display device 310, whether the signal strength of the packet is less than a first threshold (e.g., −80 dBm). If, at 904, the signal strength is not less than the first threshold, then the analyte sensor system 308 maintains its transmission power at the first transmission power level. In certain scenarios, the signal strength being greater than (or equal to) the first threshold may be indicative of at least one of (i) the analyte sensor system being in close proximity with the display device or (ii) the analyte sensor system having a substantial line-of-sight to the display device.

On the other hand, if the signal strength is less than the first threshold, then the analyte sensor system 308 proceeds to 906. In certain scenarios, the signal strength being less than the first threshold may be indicative of at least one of (i) the analyte sensor system being located a large distance away from the display device or (ii) the analyte sensor system no longer having a substantial line-of-sight to the display device. Upon transitioning from 904 to 906, the analyte sensor system 308 increases its transmission power from the first transmission power level to a second transmission power level (e.g., 4 dBm) (e.g., to increase a likelihood that the display device 310 will receive a subsequent packet(s) transmitted from the analyte sensor system 308). Additionally, at 906, the analyte sensor system 308 determines, for each packet received from the display device 310, whether the signal strength of the packet is greater than a second threshold (e.g., −70 dBm).

If the signal strength is not greater than the second threshold, then, at 906, the analyte sensor system 308 maintains its transmission power at the second transmission power level. In certain scenarios, the signal strength being less than the second threshold may be indicative of at least one of (i) the analyte sensor system 308 being located a large distance away from the display device 310 or (ii) the analyte sensor system 308 not having a substantial line-of-sight to the display device 310. On the other hand, if the signal strength is greater than the second threshold, then the analyte sensor system 308 proceeds to 904. In certain scenarios, the signal strength being greater than the second threshold may be indicative of at least one of (i) the analyte sensor system 308 being in close proximity with the display device 310 or (ii) the analyte sensor system 308 having a substantial line-of-sight to the display device 310. Upon transitioning to 904 from 906, the analyte sensor system 308 reduces its transmission power from the second transmission power level (e.g., 4 dBm) to the first transmission power level (e.g., 0 dBm). For example, it may be unnecessary to continue transmitting at the higher second transmission power level in these scenarios. Additionally, at 904, the analyte sensor system 308 determines, for each packet received from the display device 310, whether the signal strength of the packet is less than a first threshold (e.g., −80 dBm).

As described above, in embodiments where the analyte sensor system's targeted device list is full, instead of transmitting generic invitations at 902, operations 900 may begin at 908 with the analyte sensor system 308 starts transmitting targeted invitations. Thereafter, once a connection is established between the analyte sensor system 308 and the display device 310 as a result of the targeted invitations, the analyte sensor system 308 may proceed to 906. In this case, at 906, the analyte sensor system 308 determines, for each packet received from the display device 310, whether the signal strength of the packet is greater than the second threshold (e.g., −70 dBm).

If the signal strength is not greater than the second threshold, then, at 906, the analyte sensor system 308 maintains its transmission power at the second transmission power level. On the other hand, if the signal strength is greater than the second threshold, then the analyte sensor system 308 proceeds to 904. Upon transitioning from 906 to 904, the analyte sensor system 308 reduces its transmission power from the second transmission power level (e.g., 4 dBm) to the first transmission power level (e.g., 0 dBm). Additionally, at 904, the analyte sensor system 308 determines, for each packet received from the display device 310, whether the signal strength of the packet is less than a first threshold (e.g., −80 dBm) and so on.

In other words, once a connection is made, whether for the initial time (as a result of generic invitations) or whether in reconnection mode (as a result of targeted invitations), the analyte sensor system 308 may dynamically adjust its transmission power, for each response packet received from a display device. For example, when the current transmission power is equal to a first transmission power level (e.g., 0 dBm) and when the signal strength of the response packet is less than a first threshold (e.g., −80 dBm), then the analyte sensor system 308 may increase its transmission power from the first transmission power level to a second transmission power level (e.g., 4 dBm). Alternatively, when the current transmission power is equal to a first transmission power level (e.g., 0 dBm) and when the signal strength of the response packet is greater than or equal to the first threshold, then the analyte sensor system 308 may maintain its current transmission power at the first transmission power level (e.g., 0 dBm).

However, when the current transmission power is equal to a second transmission power level (e.g., 4 dBm) and when the signal strength of response the packet is greater than a second threshold (e.g., −70 dBm), then the analyte sensor system 308 may reduce its transmission power from the second transmission power level to the first transmission power level (e.g., 0 dBm). Alternatively, when the current transmission power is equal to a second transmission power level (e.g., 4 dBm) and when the signal strength of the response packet is less than or equal to the second threshold, then the analyte sensor system 308 may maintain its current transmission power at the second transmission power level (e.g., 4 dBm).

Figure 10:
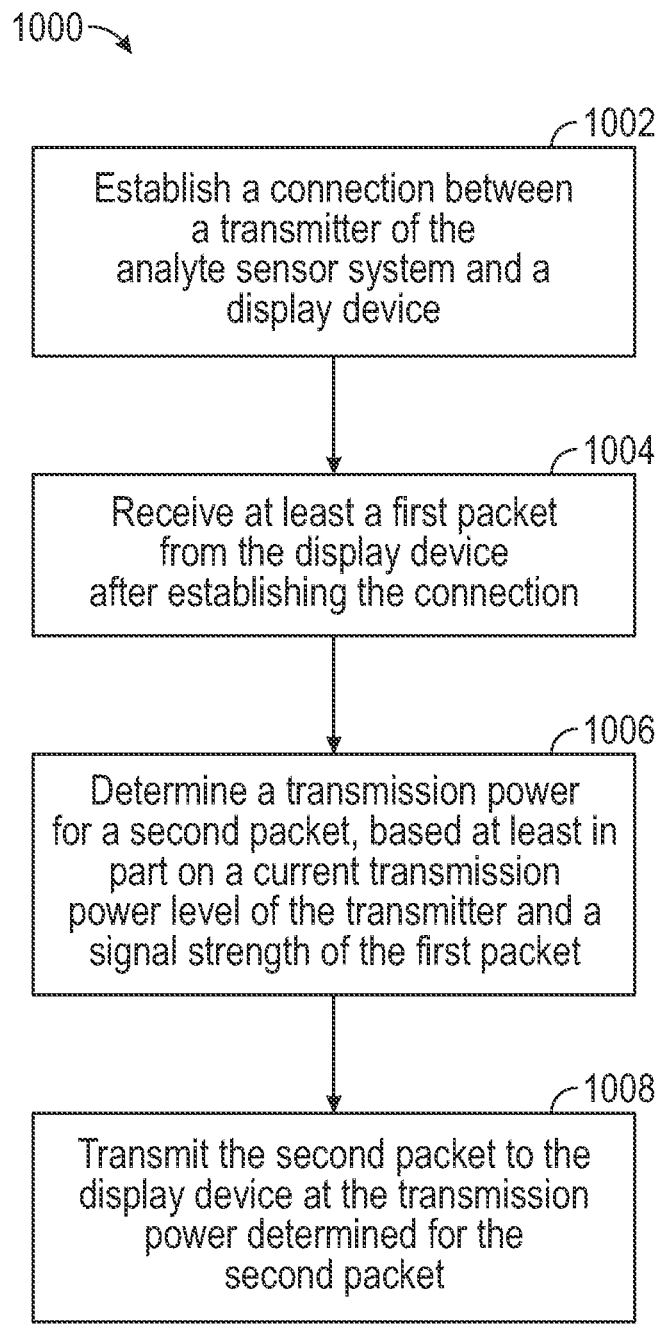
FIG. 10 is a flow diagram illustrating example operations for wireless communication by an analyte sensor system, according to certain embodiments disclosed herein.

FIG. 10 is a flow diagram illustrating example operations 1000 for wireless communication, for example, for dynamically adjusting the transmission power of messages based on signal strength of message(s) from a display device (e.g., display device 310), according to certain embodiments disclosed herein. The operations 1000 may be performed by an analyte sensor system (e.g., analyte sensor system 308).

At operation 1002, the analyte sensor system 308 establishes a connection between a transmitter (e.g., TRX 360) of the analyte sensor system 308 and the display device 310. In certain embodiments, the connection may be established as a result of a generic invitation from the analyte sensor system 308. In certain embodiments, the connection may be established as a result of a targeted invitation from the analyte sensor system 308.

At operation 1004, the analyte sensor system 308 receives at least a first packet from the display device 310 after establishing the connection. In certain embodiments where the connection is established based on a generic invitation, the first packet may be associated with at least one of an authentication procedure, a pairing procedure, a bonding procedure, or a secure data exchange between the analyte sensor system 308 and the display device 310. In certain embodiments where the connection is established based on a targeted invitation, the first packet may be associated with at least one of a reconnection request or a secure data exchange between the analyte sensor system 308 and the display device 310.

At operation 1006, the analyte sensor system 308 determines a transmission power for a second packet based at least in part on a current transmission power level of the transmitter and a signal strength of the first packet. In certain embodiments, the signal strength includes an RSSI. At operation 1008, the analyte sensor system 308 transmits the second packet to the display device 310 at the transmission power determined for the second packet.

In certain embodiments, the operations 1000 may further include receiving at least a third packet from the display device 310 after transmission of the second packet and determining a transmission power for a fourth packet, based at least in part on the current transmission power level of the transmitter and a signal strength of the third packet. Thereafter, the analyte sensor system may transmit the fourth packet to the display device 310 at the transmission power determined for the fourth packet.

In certain embodiments, determining the transmission power at 1006 for the second packet may include increasing the transmission power from a first transmission power level to a second transmission power level when the signal strength of the first packet is less than a threshold and the current transmission power level at the analyte sensor system is equal to the first transmission power level. In such embodiments, the first transmission power level may be 0 dBm, the second transmission power level may be 4 dBm, and the threshold may be −80 dBm. Note, however, that other values may be used for the first transmission power level, second transmission power level, and/or threshold.

In certain embodiments, determining the transmission power at 1006 for the second packet may include maintaining the transmission power at the current transmission power level when the signal strength of the first packet is greater than or equal to a threshold. In such embodiments, the current transmission power level at the analyte sensor system may be 0 dBm and the threshold may be −80 dBm. Note, however, that other values may be used for the current transmission power level and/or the threshold.

In certain embodiments, determining the transmission power at 1006 for the second packet may include reducing the transmission power from a first transmission power level to a second transmission power level when the signal strength of the first packet is greater than a threshold and the current transmission power level at the analyte sensor system is equal to the first transmission power level. In such embodiments, the first transmission power level may be 4 dBm, the second transmission power level may be 0 dBm, and the threshold may be −70 dBm. Note, however, that other values may be used for the first transmission power level, second transmission power level, and/or threshold.

In certain embodiments, determining the transmission power at 1006 for the second packet includes maintaining the transmission power at the current transmission power level when the signal strength is less than or equal to a threshold. In such embodiments, the current transmission power level may be 4 dBm and the threshold may be −70 dBm. Note, however, that other values may be used for the current transmission power level and/or the threshold.

Attribute Protocol and Generic Attribute Protocol

In certain embodiments, the analyte sensor system 308 and the display device 310 may perform communication over the air according to an Attribute Protocol (ATT). The ATT defines how a server (e.g., analyte sensor system 308) exposes and sends its data to a client (e.g., display device 310) and how the data is structured. There are two roles within the ATT: server and client.

The server exposes the data it controls or contains to a client, accepts incoming commands from the client, and sends responses, notifications, and indications to the client. For example, an analyte sensor system 308 may behave as a server when it exposes one or more analyte values associated with a host to a client. As described in greater detail below, the analyte sensor system 308 may also notify the client when an analyte value or other data has changed rather than have the client poll for the data waiting for a change to occur.

The client is a device that interfaces with the server for the purpose of reading the server's exposed data and/or controlling the server's behavior. The client is also configured to send commands and requests and accept incoming notifications and indications from the server. For example, a display device 310 that connects to an analyte sensor system 308 and reads one or more analyte values may act as the client. Accordingly, as used herein, the analyte sensor system 308 may be referred to as the "server" and the display device 310 may be referred to as the "client."

In some embodiments, the data that the server exposes is generally structured as attributes. An attribute is a generic term for any type of data exposed by the server and defines the structure of the data. Attributes may be made up of the following: (i) an attribute type, (ii) an attribute handle, and (iii) attribute permissions. The attribute type may be a UUID indicative of the type of data (e.g., the UUID for a SIG-adopted temperature measurement value is 0x2A1C). In certain embodiments, the attribute type may use a SIG-adopted UUID or a custom UUID. The attribute handle may be a 16-bit value that the server assigns to each of its attributes and functions as an address for a given attribute. This value may be used by the client and/or server to reference a specific attribute. Attribute permissions determine whether an attribute may be read or written to, whether it may be notified or indicated, and what security levels are required for each of these operations. These permissions are defined at a higher layer (e.g., Generic Attribute Protocol (GATT) layer or application layer), described in more detail below.

In certain analyte sensor system applications, data may be exchanged using the GATT, which may be viewed as a meta-layer "on top" of ATT. GATT defines the format of services and their characteristics, as well as the procedures that are used to interface with attributes. Examples of attributes include service discovery, characteristic reads, characteristic writes, notifications, and indications. A service is a grouping of one or more attributes, some of which are characteristics. A service is meant to group together related attributes that satisfy a specific functionality on the server. For example, the SIG-adopted Battery Service contains one characteristic known as the Battery Level.

A characteristic is part of a service and represents a piece of information/data that a server wants to expose to a client. For example, the battery level characteristic represents a remaining power level of a battery in a device which may be read by a client (e.g., display device 310). The characteristic may include attributes, such as (characteristic) properties, a characteristic value, zero or more descriptors, etc. Properties may define how a characteristic value may be used. Some examples include read, write, write without response, notify, and indicate. Descriptors are generally used to contain related information about the characteristic value. Some examples include extended properties, user description, fields used for subscribing to notifications and indications (e.g., CCCD), and a field that defines the presentation of the characteristic value such as the format and the unit of the value.

Profiles, which are also defined by GATT, are broader in definition than services. Profiles typically define the behavior of both the client and server when it comes to services, characteristics, connections, security requirements, etc. In certain embodiments, a profile may be a Bluetooth SIG-adopted profile or a custom defined profile (e.g., defined at the application layer).

CCCD is a descriptor (in particular, a client characteristic configuration descriptor) that may be included within each characteristic. With CCCD, a server may allow a client to opt-in to "push" style data updates from the server, as opposed to the client sending read requests for any data updates. Characteristics that properly support the CCCD also support "push" style notifications (if the client opts-in). Rather than a client continually reading the value, the client may configure the server to send updates when they happen. For example, if the client wants to have data pushed to it when the data changes, the client may write a value to the CCCD. The value depends on the style of update. There are generally two styles of push update: (i) notification and (ii) indication. With "indication," the server gets a confirmation that the client did get the update. With "notification," the server does not get a confirmation that the client received the update.

Example BLE Architecture

Figure 11:
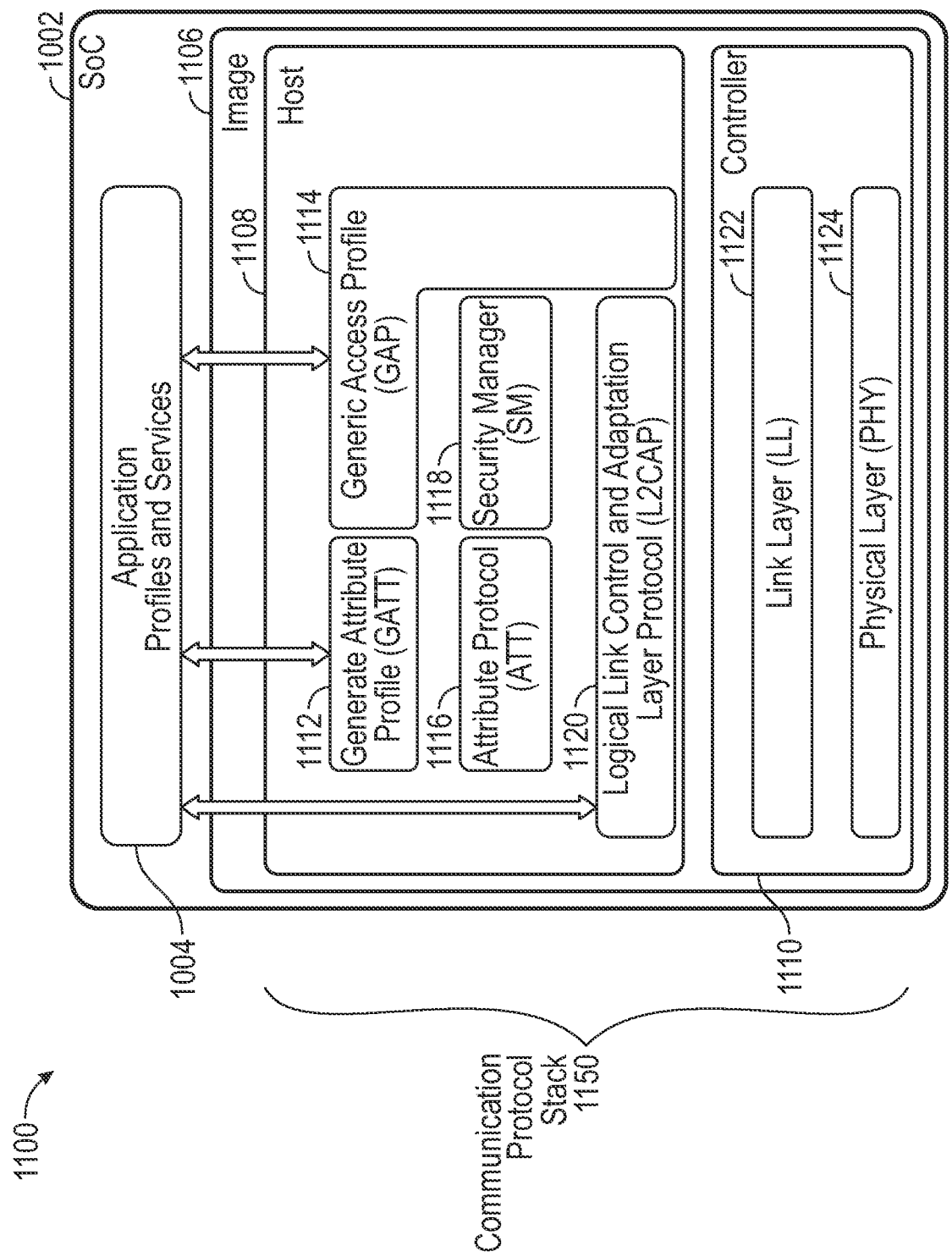
FIG. 11 illustrates an example communication protocol stack architecture, according to certain embodiments disclosed herein.

FIG. 11 illustrates an example communication protocol architecture 1100 (e.g., a short-range communication protocol such as Bluetooth Low Energy protocol), according to certain embodiments. In the depicted embodiment, the communication protocol architecture 1100 includes an application 1104, a host 1108, and a controller 1110. The application 1104 is generally a user application that interfaces with the communication protocol stack 1150, which includes the host 1108 and the controller 1110. The application 1104 may include standard profiles (with one or more services), custom profiles (with one or more services), and/or libraries imported from a SDK. In certain embodiments, a (software) image 1106 may implement the communication protocol stack 1150 for a system-on-chip (SoC) (e.g., a processor).

The controller 1110 includes the lower layers of the communication protocol stack 1150. In FIG. 11, the controller 1110 includes a Link Layer (LL) 1122 and a Physical Layer (PHY) 1124. The PHY 1124 is the lowest layer of the communication protocol stack 1150 and provides its services to the LL 1122. The PHY 1124 may include analog communication circuitry responsible for translation of digital data over the air. The LL 1122 interfaces directly with the PHY 1124 and is generally responsible for tasks, such as (i) advertising, scanning, and creating/maintaining connections, (ii) encapsulating the data received from the upper layers and generating packets that are passed bit by bit to the PHY 1124, (iii) performing packet error-detecting, (iv) encryption/decryption of the communication, (v) device address management, (vi) defining the role and state of the device (e.g., inviter—a device sending invitation packets, scanner—a device scanning for invitation packets, master—a device that initiates a connection and manages it, or slave—a device that accepts a connection request and follows the master's timing), and the like.

Although not shown in FIG. 11, in certain embodiments, the communication protocol stack 1150 may also include a host controller interface (HCI), which is a thin layer that transports commands and events between the host 1108 and controller 1110 of the BLE protocol stack 1150.

The host 1108 includes upper layers of the communication protocol stack 1150. Here, the host 1108 includes GATT 1112, GAP 1114, ATT 1116, Security Manager (SM) 1118, and Logical Link control and Adaptation Layer Protocol (L2CAP) 1120. The L2CAP 1120 provides multiplexing for the higher layers. This enables protocols like the ATT 1116 and SM 1118 to share the same controller 1110. This layer is also responsible for segmentation, and reassembly operation for packets exchanged between the upper layers and the controller 1110.

The SM 1118 is generally responsible for enabling security for applications running over the communication protocol. For example, the SM 1118 may provide device authentication, device authorization, device privacy, data integrity, and the like. As noted, ATT 1116 is a client/server protocol based on attributes presented by a device. For example, ATT 1116 may define how to transfer a unit of data (attribute). Generally, a client requests data from a server, and the server then sends data to the client. A server may also initiate a data transfer using an indication or notification.

As noted, GATT 1112 is generally a frequently interacted with layer of the communication protocol stack 1150. GATT 1112 is implemented on top of the ATT 1116 and uses it as its transport layer. The application 1102 may exchange data information with the communication protocol stack 1150 via GATT 1112. GAP 1114 defines procedures on how devices discover and connect. It also provides a layer to the SM 1118 for pairing, creating bonds, and ensuring privacy. The application 1102 may exchange control information with the communication protocol stack 1150 via GAP 1114.

Example Techniques for Reducing CCCD Messaging

As noted, one technical deficiency with certain communication protocols that support CCCD is that the repeated enabling/disabling of CCCD may lead to an unnecessary number of messages being exchanged between the analyte sensor system 308 and the display device 310. This may, in turn, significantly increase power consumption at the analyte sensor system 308.

In general, there are various characteristics that the analyte sensor system 308 may be configured to expose to the display device 310. By way of example, authentication information, synchronization information, and read estimated glucose values are characteristics that the analyte sensor system 308 may want to expose to the display device 310. However, in accordance with current communication protocols, before the display device 310 is able to obtain any of this information, the display device 310 may have to enable CCCD for each of these characteristics. In other words, the display device 310 has to transmit a separate packet to the analyte sensor system 308 with a bit set for enabling CCCD, which then causes the analyte sensor system 308 to transmit the respective information to the display device 310.

By way of example, FIG. 12 illustrates an example connection flow 1200 that involves repeatedly enabling/disabling CCCD for different characteristics. Using authentication information, synchronization information, and analyte information as reference examples of characteristic data, currently if the display device 310 does not separately enable CCCD for each of the authentication information, synchronization information, and analyte information, the analyte sensor system 308 may not send any of this information to the display device 310, delaying the connection procedure and/or other procedures that the display device 310 may perform using such information. Consequently, in order to perform the connection procedure and/or other procedures, the display device 310 may have to separately enable CCCD for each characteristic (stream of data). In addition, the display device 310 may have to separately disable CCCD for each characteristic, so that the display device 310 does not receive information that it does not want to receive or does not have space to receive.

More specifically, as shown in FIG. 12, upon connecting with the analyte sensor system 308 at 1202, the display device 310 enables CCCD at 1204 for receiving authentication information (e.g., a first characteristic) from analyte sensor system 308, performs authentication with analyte sensor system 308 at 1206 based on the authentication information "pushed" from the analyte sensor system 308, and disables CCCD at 1208 for the authentication information.

Thereafter, at 1210, the display device 310 enables CCCD for receiving synchronization information (e.g., a second characteristic) from analyte sensor system 308, performs synchronization with from analyte sensor system 308 at 1212 based on the synchronization information "pushed" from the analyte sensor system 308, and disables CCCD for synchronization information at 1214. Again, thereafter, at 1216, the display device 310 enables CCCD for receiving analyte information (e.g., a third characteristic) from analyte sensor system 308, processes the analyte information "pushed" from the analyte sensor system 308 at 1218, and disables CCCD for analyte information at 1220. The display device 310 then disconnects (1222).

As noted, repeated enabling/disabling of CCCD may lead to increased and unnecessary power consumption at the analyte sensor system 308 and the display device 310. Additionally, the enabling and disabling of CCCD may cause signal loss due to errors involving enabling CCCD indications. For example, there may be an increased likelihood of transmission errors, each time CCCD is enabled and disabled. These transmission errors may cause the display device 310 to miss data updates from the analyte sensor system 308. Further, another technical issue associated with the repeated enabling and disabling of CCCD is that because certain proprietary transmitters may be configured to only transmit data in response to a data request (and not when data is available), whether CCCD is enabled or not at the analyte sensor system 308 may not impact data transmission by the analyte sensor system 308.

To address the technical deficiencies described above, certain embodiments described herein provide techniques for reducing one or more CCCD messages exchanged between an analyte sensor system 308 and the display device 310. For example, in certain embodiments, a custom profile may be created (or defined) for use by the display device 310. In some embodiments, the custom profile may be provided as part of an analyte sensor application (e.g., analyte sensor application 330 of FIG. 3B) and executed at the application layer on the display device 310. The custom profile may configure the display device 310 to refrain from (or to prevent) enabling and disabling CCCD for each set of predefined characteristics, as part of the communication between the analyte sensor system 308 and the display device 310.

In some embodiments, the predefined characteristics may include, for example, authentication information, synchronization information, analyte information, etc. By using a custom profile to prevent the display device 310 from enabling/disabling CCCD by default, the number of messages sent by the display device 310 to the analyte sensor system 308 may be reduced, as shown in FIG. 13. For example, compared to the connection flow 1200 depicted in FIG. 12, in the connection flow 1300 depicted in FIG. 13, the display device 310 may perform operations in 1206, 1212, and/or 1218 without enabling/disabling CCCD.

Note that, in certain embodiments, eliminating CCCD messaging for the analyte sensor system 308 and the display device 310 that execute proprietary software instructions may not impact data flow. The proprietary software instructions may be provided (e.g., by a sensor manufacturer) in the form of an analyte sensor application (e.g., analyte sensor application 330 of FIG. 3B) for use by the display device 310. The proprietary software instructions may also be provided (e.g., by a sensor manufacturer) in the form of an application for execution on analyte sensor system 308. The proprietary software instructions described above may configure the display device 310 and the analyte sensor system 308 such that: (i) the analyte sensor system 308 only sends data in response to requests from the display device 310, (ii) the display device 310 sends requests only when data is needed, (iii) sending a request from the display device 310 captures the same function as enabling CCCD, and/or (iv) after a response is sent, the behavior of the analyte sensor system 308 is the same as if the display device 310 has disabled CCCD (e.g., therefore, the display device 310 does not have to disable CCCD at the analyte sensor system 308).

In certain embodiments, when the display device 310 executes a first operating system (e.g., an Android operating system), a custom profile may eliminate a need for an analyte sensor application (e.g., a mobile application) executing on the display device 310 to enable/disable CCCD each time the analyte sensor application accesses the characteristics. In certain embodiments, when the display device 310 executes a second operating system (e.g., an iOS operating system), a custom profile may eliminate a need for an analyte sensor application to disable CCCD each time the analyte sensor application accesses the characteristics. However, due to a limitation from the interface of the second operating system, the custom profile may not be able to prevent an analyte sensor application from enabling CCCD.

In certain embodiments, a custom profile may be created and defined on the analyte sensor system 308 (e.g., at the application layer). For example, prior to initialization of a processor of the analyte sensor system 308 (e.g., processor 380 of FIG. 3B) that includes the communication protocol stack 1150, the custom profile may configure the processor to (i) obtain properties for each set of predetermined characteristics (e.g., authentication information, synchronization information, analyte information, etc.), obtain attribute handles used by the processor for the properties of each set of predefined characteristics, and set or define a CCCD configuration of the processor. As part of the CCCD configuration, the processor may be configured such that each characteristic has CCCD enabled by default (across all connections with display devices, whether bonded or non-bonded).

In certain embodiments, the custom profile may configure/load the processor of the analyte sensor system 308 with the properties (having CCCD enabled by default), since the custom profile may not have control over the communication protocol stack 1150 once the processor is initialized. Moreover, in current communication protocols, the analyte sensor system 308 may not be able to send any data to a display device unless CCCD is enabled for that data. Accordingly, the custom profile is configured to enable CCCD on all characteristics for all display devices 310, whether bonded or non-bonded.

In certain embodiments, regardless of whether the display device 310 is bonded or non-bonded, the custom profile on the analyte sensor system 308 may be configured to enable CCCD by default for each new connection with the display device 310 (e.g., as opposed to saving the CCCD value across connections for bonded devices).

In certain embodiments, the analyte sensor system 308 may still be able to interact with certain display devices (referred to herein as "third-party display devices") that may not be configured to prevent enabling/disabling CCCD by default. For example, if a third party display device (that is configured to enable/disable CCCD) transmits a CCCD enablement indication to an analyte sensor system 308 that has CCCD already enabled (based on the customer profile), then the CCCD configuration of the analyte sensor system 308 may not change (e.g., CCCD is already enabled). In another example, if a third party display device (that is configured to enable/disable CCCD) transmits a CCCD disablement indication to an analyte sensor system 308 that has CCCD already enabled, then the CCCD configuration may change (e.g., that CCCD may be disabled). In this example, for a subsequent connection, the CCCD configuration is set back to enabled, regardless of the previous override of the CCCD configuration by the third party display device (e.g., as opposed to saving the CCCD configuration across connections for bonded devices and automatically disabling CCCD for reconnections with non-bonded devices).

Figure 14:
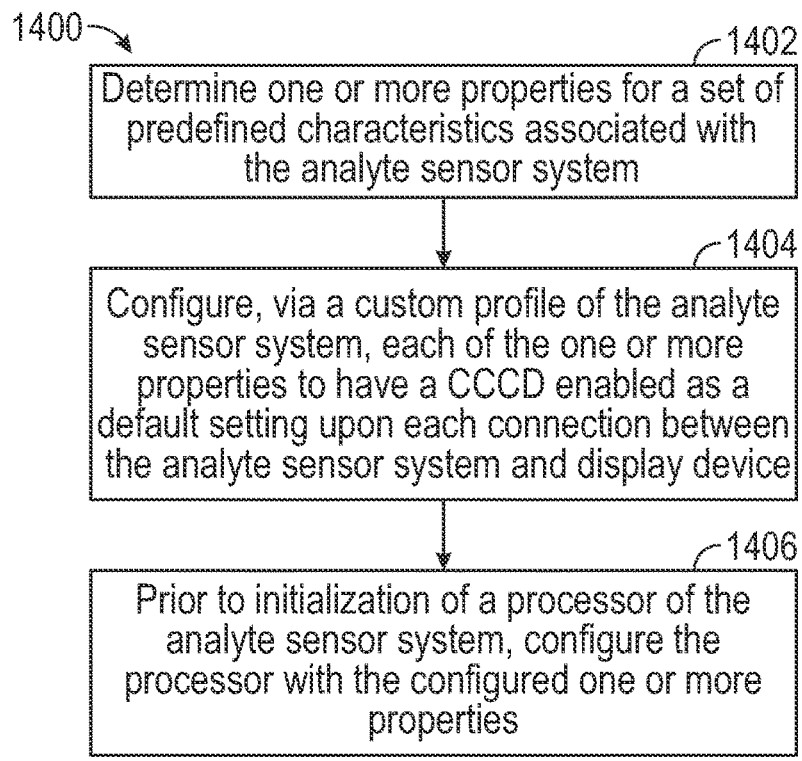
FIG. 14 is a flow diagram illustrating example operations for wireless communication by an analyte sensor system, according to certain embodiments disclosed herein.

FIG. 14 is a flow diagram illustrating example operations 1400 for wireless communication, for example, for reducing a number of CCCD messages exchanged between an analyte sensor system 308 and a display device 310, according to certain embodiments disclosed herein. The operations 1400 may be performed by an analyte sensor system (e.g., analyte sensor system 308).

At operation 1402, the analyte sensor system 308 determines one or more properties for a set of predefined characteristics associated with the analyte sensor system 308. The set of predefined characteristics may include authentication information, synchronization information, analyte information, etc.

At operation 1404, the analyte sensor system 308 configures, via a custom profile of the analyte sensor system, each of the one or more properties to have a CCCD enabled as a default setting upon each connection between the analyte sensor system 308 and a display device 310.

At operation 1406, prior to initialization of a processor of the analyte sensor system 308, the analyte sensor system 308 configures the processor with the configured one or more properties.

In certain embodiments, the operations 1400 may also include the analyte sensor system 308 establishing a connection with the display device 310 and, after establishing the connection, receiving a CCCD enablement indication for at least one of the one or more properties from the display device 310. Thereafter, in response to the CCCD enablement indication, the analyte sensor system 308 may refrain from modifying the respective CCCD for the at least one of the one or more properties.

In certain embodiments, the operations 1400 may also include the analyte sensor system 308 establishing a connection with the display device and, after establishing the connection, receiving a CCCD disablement indication for at least one of the one or more properties from the display device 310. Thereafter, in response to the CCCD disablement indication, the analyte sensor system 308 may modify the at least one of the one or more properties to have the respective CCCD disabled.

Figure 15:
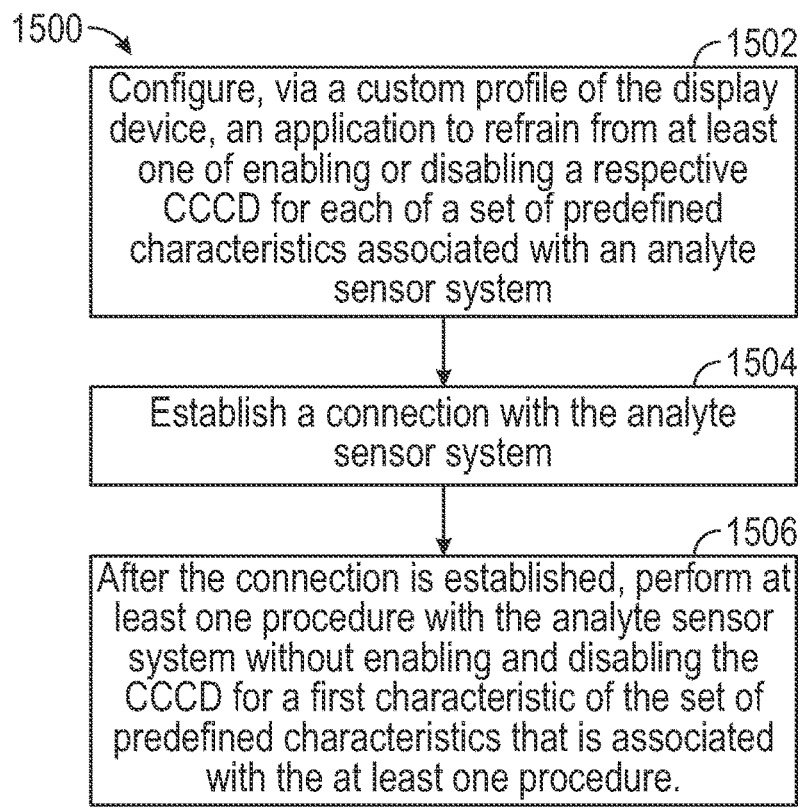
FIG. 15 is a flow diagram illustrating example operations for wireless communication by an analyte sensor system, according to certain embodiments disclosed herein.

FIG. 15 is a flow diagram illustrating example operations 1500 for wireless communication, for example, for reducing a number of CCCD messages exchanged between an analyte sensor system 308 and a display device 310, according to certain embodiments disclosed herein. The operations 1500 may be performed by a display device (e.g., display device 310).

At operation 1502, the display device 310 configures, via a custom profile of the display device 310, an application to refrain from at least one of enabling or disabling a respective CCCD for each of a set of predefined characteristics associated with an analyte sensor system 308.

At operation 1504, the display device 310 establishes a connection with the analyte senor system 308. At 1506, after the connection is established, the display device 310 performs at least one procedure with the analyte sensor system without enabling and disabling the CCCD for a first characteristic of the set of predefined characteristics that is associated with the at least one procedure. In certain embodiments, the at least one procedure comprises an authentication procedure, a synchronization procedure, and/or reading an analyte value.

Example Clauses

Implementation examples are described in the following numbered clauses:

Clause 1: A method for wireless communication performed by an analyte sensor system, the method comprising: transmitting one or more first invitation messages having a first payload size when a list of previously authenticated devices has at least one unfilled entry; transmitting one or more second invitation messages having a second payload size, smaller than the first payload size, when the list includes at least one device; and establishing a communication session between the analyte sensor system and at least one device, based on at least one of the first invitation messages or the second invitation messages.

Clause 2: The method of Clause 1, further comprising refraining from transmitting the one or more first invitation messages when the list does not include at least one unfilled entry.

Clause 3: The method of any of Clauses 1-2, wherein the one or more second invitation messages are transmitted further when the list does not include at least one unfilled entry.

Clause 4: The method of any of Clauses 1-3, wherein the one or more second invitation messages are transmitted after the one or more first invitation messages.

Clause 5: The method of any of Clauses 1-4, wherein: the one or more first invitation messages comprise a generic address profile (GAP) address of the analyte sensor system; and the one or more first invitation messages have one or more invitation data structures.

Clause 6: The method of any of Clauses 1-5, wherein the one or more second invitation messages only include a generic address profile (GAP) address of the analyte sensor system.

Clause 7: A method for wireless communication performed by an analyte sensor system, the method comprising: establishing a connection between a transmitter of the analyte sensor system and a display device; receiving at least a first packet from the display device after establishing the connection; determining a transmission power for a second packet, based at least in part on a current transmission power level of the transmitter and a signal strength of the first packet; and transmitting the second packet to the display device at the transmission power determined for the second packet.

Clause 8: The method of Clause 7, further comprising: receiving at least a third packet from the display device after transmission of the second packet; determining a transmission power for a fourth packet, based at least in part on the current transmission power level of the transmitter and a signal strength of the third packet; and transmitting the fourth packet to the display device at the transmission power determined for the fourth packet.

Clause 9: The method of any of Clauses 7-8, wherein determining the transmission power comprises increasing the transmission power from a first transmission power level to a second transmission power level when the signal strength of the first packet is less than a threshold and the current transmission power level is equal to the first transmission power level.

Clause 10: The method of any of Clauses 7-8, wherein determining the transmission power comprises maintaining the transmission power at the current transmission power level when the signal strength is greater than or equal to a threshold.

Clause 11: The method of any of Clauses 7-8, wherein determining the transmission power comprises reducing the transmission power from a first transmission power level to a second transmission power level when the signal strength of the first packet is greater than a threshold and the current transmission power level is equal to the first transmission power level.

Clause 12: The method of any of Clauses 7-8, wherein determining the transmission power comprises maintaining the transmission power at the current transmission power level when the signal strength of the first packet is less than or equal to a threshold.

Clause 13: The method of any of Clauses 7-12, wherein establishing the connection comprises receiving a connection request from the display device in response to a generic invitation from the transmitter.

Clause 14: The method of any of Clauses 7-12, wherein establishing the connection comprises receiving a reconnection request from the display device in response to a targeted invitation from the transmitter.

Clause 15: A method for wireless communication performed by an analyte sensor system, the method comprising: determining one or more properties for a set of predefined characteristics associated with the analyte sensor system; configuring, via a custom profile of the analyte sensor system, each of the one or more properties to have a client characteristic configuration descriptor (CCCD) enabled as a default setting upon each connection between the analyte sensor system and a display device; and prior to initialization of a processor of the analyte sensor system, configuring the processor with the configured one or more properties.

Clause 16: The method of Clause 15, further comprising: establishing a connection with the display device; after establishing the connection, receiving a CCCD enablement indication for at least one of the one or more properties from the display device; and in response to the CCCD enablement indication, refraining from modifying the respective CCCD for the at least one of the one or more properties.

Clause 17: The method of any of Clauses 15-16, further comprising: establishing a connection with the display device; after establishing the connection, receiving a CCCD disablement indication for at least one of the one or more properties from the display device; and in response to the CCCD disablement indication, modifying the at least one of the one or more properties to have the respective CCCD disabled.

Clause 18: A method for wireless communication performed by a display device, the method comprising: configuring, via a custom profile of the display device, an application to refrain from at least one of enabling or disabling a respective client characteristic configuration descriptor (CCCD) for each of a set of predefined characteristics associated with an analyte sensor system; establishing a connection with the analyte sensor system; and after the connection is established, performing at least one procedure with the analyte sensor system without enabling and disabling the CCCD for a first characteristic of the set of predefined characteristics that is associated with the at least one procedure.

Clause 19: The method of Clause 18, wherein the at least one procedure comprises an authentication procedure.

Clause 20: The method of Clause 18, wherein the at least one procedure comprises a synchronization procedure.

Clause 21: The method of Clause 18, wherein the at least one procedure comprises reading an analyte value.

Clause 22: An analyte sensor system, comprising: a memory comprising executable instructions; and one or more processors configured to execute the executable instructions and cause the analyte sensor system to: transmit one or more first invitation messages having a first payload size when a list of previously authenticated devices has at least one unfilled entry; transmit one or more second invitation messages having a second payload size, smaller than the first payload size, when the list includes at least one device; and establish a communication session between the analyte sensor system and at least one device, based on at least one of the first invitation messages or the second invitation messages.

Clause 23: The analyte sensor system of Clause 22, wherein the one or more processors are further configured to cause the analyte sensor system to refrain from transmitting the one or more first invitation messages when the list does not include at least one unfilled entry.

Clause 24: The analyte sensor system of any of Clauses 22-23, wherein the one or more processors are further configured to cause the analyte sensor system to transmit the one or more second invitation messages when the list does not include at least one unfilled entry.

Clause 25: The analyte sensor system of any of Clauses 22-24, wherein the one or more processors are further configured to cause the analyte sensor system to transmit the one or more second invitation messages after the one or more first invitation messages.

Clause 26: The analyte sensor system of any of Clauses 22-25, wherein: the one or more first invitation messages comprise a generic address profile (GAP) address of the analyte sensor system; and the one or more first invitation messages have one or more invitation data structures.

Clause 27: The analyte sensor system of any of Clauses 22-26, wherein the one or more second invitation messages only include a generic address profile (GAP) address of the analyte sensor system.

Clause 28: An analyte sensor system, comprising: a memory comprising executable instructions; and one or more processors configured to execute the executable instructions and cause the analyte sensor system to: establish a connection between a transmitter of the analyte sensor system and a display device; receive at least a first packet from the display device after establishing the connection; determine a transmission power for a second packet, based at least in part on a current transmission power level of the transmitter and a signal strength of the first packet; and transmit the second packet to the display device at the transmission power determined for the second packet.

Clause 29: The analyte sensor system of Clause 28, wherein the one or more processors are further configured to cause the analyte sensor system to: receive at least a third packet from the display device after transmission of the second packet; determine a transmission power for a fourth packet, based at least in part on the current transmission power level of the transmitter and a signal strength of the third packet; and transmit the fourth packet to the display device at the transmission power determined for the fourth packet.

Clause 30: The analyte sensor system of any of Clauses 28-29, wherein, in order to determine the transmission power, the one or more processors are configured to cause the analyte sensor system to increase the transmission power from a first transmission power level to a second transmission power level when the signal strength of the first packet is less than a threshold and the current transmission power level is equal to the first transmission power level.

Clause 31: The analyte sensor system of any of Clauses 28-29, wherein, in order to determine the transmission power, the one or more processors are configured to cause the analyte sensor system to maintain the transmission power at the current transmission power level when the signal strength is greater than or equal to a threshold.

Clause 32: The analyte sensor system of any of Clauses 28-29, wherein, in order to determine the transmission power, the one or more processors are configured to cause the analyte sensor system to reduce the transmission power from a first transmission power level to a second transmission power level when the signal strength of the first packet is greater than a threshold and the current transmission power level is equal to the first transmission power level.

Clause 33: The analyte sensor system of any of Clauses 28-29, wherein, in order to determine the transmission power, the one or more processors are configured to cause the analyte sensor system to maintain the transmission power at the current transmission power level when the signal strength of the first packet is less than or equal to a threshold.

Clause 34: The analyte sensor system of any of Clauses 28-33, wherein, in order to establish the connection, the one or more processors are configured to cause the analyte sensor system to receive a connection request from the display device in response to a generic invitation from the transmitter.

Clause 35: The analyte sensor system of any of Clauses 28-33, wherein, in order to establish the connection, the one or more processors are configured to cause the analyte sensor system to receive a reconnection request from the display device in response to a targeted invitation from the transmitter.

Clause 36: An analyte sensor system, comprising: a memory comprising executable instructions; and one or more processors configured to execute the executable instructions and cause the analyte sensor system to: determine one or more properties for a set of predefined characteristics associated with the analyte sensor system; configure, via a custom profile of the analyte sensor system, each of the one or more properties to have a client characteristic configuration descriptor (CCCD) enabled as a default setting upon each connection between the analyte sensor system and a display device; and prior to initialization of a processor of the analyte sensor system, configure the processor with the configured one or more properties.

Clause 37: The analyte sensor system of Clause 36, wherein the one or more processors are further configured to cause the analyte sensor system to: establish a connection with the display device; after establishing the connection, receive a CCCD enablement indication for at least one of the one or more properties from the display device; and in response to the CCCD enablement indication, refrain from modifying the respective CCCD for the at least one of the one or more properties.

Clause 38: The analyte sensor system of Clause 37, wherein the one or more processors are further configured to cause the analyte sensor system to: establish a connection with the display device; after establishing the connection, receive a CCCD disablement indication for at least one of the one or more properties from the display device; and in response to the CCCD disablement indication, modify the at least one of the one or more properties to have the respective CCCD disabled.

Clause 39: A display device, comprising: a memory comprising executable instructions; and one or more processors configured to execute the executable instructions and cause the analyte sensor system to: configure, via a custom profile of the display device, an application to refrain from at least one of enabling or disabling a respective client characteristic configuration descriptor (CCCD) for each of a set of predefined characteristics associated with an analyte sensor system; establish a connection with the analyte sensor system; and after the connection is established, perform at least one procedure with the analyte sensor system without enabling and disabling the CCCD for a first characteristic of the set of predefined characteristics that is associated with the at least one procedure.

Clause 40: The display device of Clause 39, wherein the at least one procedure comprises an authentication procedure.

Clause 41: The display device of Clause 39, wherein the at least one procedure comprises a synchronization procedure.

Clause 42: The display device of Clause 39, wherein the at least one procedure comprises reading an analyte value.

Clause 43: An analyte monitoring system, comprising: a display device; and an analyte sensor system, wherein: the analyte sensor system is configured to: transmit one or more first invitation messages having a first payload size when a list of previously authenticated devices has at least one unfilled entry; transmit one or more second invitation messages having a second payload size, smaller than the first payload size, when the list includes at least one device; and establish a communication session between the analyte sensor system and a display device, based on at least one of the first invitation messages or the second invitation messages; and the display device is configured to: receive at least one of the one or more first invitation messages having the first payload side or the one or more second invitation messages having the second payload size; and establish the communication session between the analyte sensor system and the display device, based on at least one of the first invitation messages or the second invitation messages.

Clause 44: An analyte monitoring system, comprising: a display device; and an analyte sensor system, wherein: the analyte sensor system is configured to: establish a connection between a transmitter of the analyte sensor system and the display device; receive at least a first packet from the display device after establishing the connection; determine a transmission power for a second packet, based at least in part on a current transmission power level of the transmitter and a signal strength of the first packet; and transmit the second packet to the display device at the transmission power determined for the second packet; and the display device is configured to: establish the connection between the transmitter of the analyte sensor system and the display device; transmit at least the first packet to the analyte sensor system after establishing the connection; receive the second packet from the analyte sensor system at the transmission power determined based on the signal strength of the first.

Clause 45: An analyte monitoring system, comprising: a display device; and an analyte sensor system, wherein: the analyte sensor system is configured to: determine one or more properties for a set of predefined characteristics associated with the analyte sensor system; configure, via a custom profile of the analyte sensor system, each of the one or more properties to have a client characteristic configuration descriptor (CCCD) enabled as a default setting upon each connection between the analyte sensor system and a display device; and prior to initialization of a processor of the analyte sensor system, configure the processor with the configured one or more properties; and the display device is configured to configure, via the custom profile of the display device, an application to refrain from at least one of enabling or disabling a respective CCCD for each of a set of predefined characteristics associated with the analyte sensor system; establish a connection with the analyte sensor system; and after the connection is established, perform at least one procedure with the analyte sensor system without enabling and disabling the CCCD for a first characteristic of the set of predefined characteristics that is associated with the at least one procedure.

Additional Considerations

Each of the non-limiting examples presented above may stand on its own or may be combined in various permutations or combinations with one or more of the other examples. The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Geometric terms, such as "parallel", "perpendicular", "round", or "square", are not intended to require absolute mathematical precision, unless the context indicates otherwise. Instead, such geometric terms allow for variations due to manufacturing or equivalent functions. For example, if an element is described as "round" or "generally round", a component that is not precisely circular (e.g., one that is slightly oblong or is a many-sided polygon) is still encompassed by this description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

What is claimed is:

1. A method for wireless communication performed by an analyte sensor system, the method comprising:
    transmitting one or more first invitation messages having a first payload size when a list of previously authenticated devices has at least one unfilled entry;
    transmitting one or more second invitation messages having a second payload size, smaller than the first payload size, when the list includes at least one device;
    transmitting the one or more second invitation messages when the list does not include at least one unfilled entry; and
    establishing a communication session between the analyte sensor system and at least one device, based on at least one of the first invitation messages or the second invitation messages.

2. The method of claim 1, further comprising refraining from transmitting the one or more first invitation messages when the list does not include at least one unfilled entry.

3. The method of claim 1, wherein the one or more second invitation messages are transmitted after the one or more first invitation messages.

4. A method for wireless communication performed by an analyte sensor system, the method comprising:
    transmitting one or more first invitation messages having a first payload size when a list of previously authenticated devices has at least one unfilled entry, wherein:
        the one or more first invitation messages comprise a generic address profile (GAP) address of the analyte sensor system; and
        the one or more first invitation messages have one or more invitation data structures;
    transmitting one or more second invitation messages having a second payload size, smaller than the first payload size, when the list includes at least one device; and
    establishing a communication session between the analyte sensor system and at least one device, based on at least one of the first invitation messages or the second invitation messages.

5. A method for wireless communication performed by an analyte sensor system, the method comprising:
    transmitting one or more first invitation messages having a first payload size when a list of previously authenticated devices has at least one unfilled entry;
    transmitting one or more second invitation messages having a second payload size, smaller than the first payload size, when the list includes at least one device, wherein the one or more second invitation messages only include a generic address profile (GAP) address of the analyte sensor system; and establishing a communication session between the analyte sensor system and at least one device, based on at least one of the first invitation messages or the second invitation messages.

6. An analyte sensor system, comprising:
at least one memory comprising executable instructions; and
one or more processors configured to execute the executable instructions and cause the analyte sensor system to:
   transmit one or more first invitation messages having a first payload size when a list of previously authenticated devices has at least one unfilled entry;
   transmit one or more second invitation messages having a second payload size, smaller than the first payload size, when the list includes at least one device;
   transmit the one or more second invitation messages when the list does not include at least one unfilled entry; and
   establish a communication session between the analyte sensor system and at least one device, based on at least one of the first invitation messages or the second invitation messages.

7. The analyte sensor system of claim 6, wherein the one or more processors are further configured to cause the analyte sensor system to refrain from transmitting the one or more first invitation messages when the list does not include at least one unfilled entry.

8. The analyte sensor system of claim 6, wherein the one or more processors are further configured to cause the analyte sensor system to transmit the one or more second invitation messages after the one or more first invitation messages.

9. An analyte sensor system, comprising:
at least one memory comprising executable instructions; and
one or more processors configured to execute the executable instructions and cause the analyte sensor system to:
   transmit one or more first invitation messages having a first payload size when a list of previously authenticated devices has at least one unfilled entry, wherein:
      the one or more first invitation messages comprise a generic address profile (GAP) address of the analyte sensor system; and
      the one or more first invitation messages have one or more invitation data structures;
   transmit one or more second invitation messages having a second payload size, smaller than the first payload size, when the list includes at least one device; and
   establish a communication session between the analyte sensor system and at least one device, based on at least one of the first invitation messages or the second invitation messages.

10. An analyte sensor system, comprising:
at least one memory comprising executable instructions; and
one or more processors configured to execute the executable instructions and cause the analyte sensor system to:
   transmit one or more first invitation messages having a first payload size when a list of previously authenticated devices has at least one unfilled entry;
   transmit one or more second invitation messages having a second payload size, smaller than the first payload size, when the list includes at least one device, wherein the one or more second invitation messages only include a generic address profile (GAP) address of the analyte sensor system; and
   establish a communication session between the analyte sensor system and at least one device, based on at least one of the first invitation messages or the second invitation messages.

11. An analyte monitoring system, comprising:
a display device; and
an analyte sensor system, wherein:
   the analyte sensor system is configured to:
      transmit one or more first invitation messages having a first payload size when a list of previously authenticated devices has at least one unfilled entry;
      transmit one or more second invitation messages having a second payload size, smaller than the first payload size, when the list includes at least one device;
      transmit the one or more second invitation messages when the list does not include at least one unfilled entry; and
      establish a communication session between the analyte sensor system and a display device, based on at least one of the first invitation messages or the second invitation messages; and
   the display device is configured to:
      receive at least one of the one or more first invitation messages having the first payload size or the one or more second invitation messages having the second payload size; and
      establish the communication session between the analyte sensor system and the display device, based on at least one of the first invitation messages or the second invitation messages.

12. The analyte monitoring system of claim 11, wherein the analyte sensor system is further configured to refrain from transmitting the one or more first invitation messages when the list does not include at least one unfilled entry.

13. The analyte monitoring system of claim 11, wherein the one or more second invitation messages are transmitted after the one or more first invitation messages.

14. An analyte monitoring system, comprising:
a display device; and
an analyte sensor system, wherein:
   the analyte sensor system is configured to:
      transmit one or more first invitation messages having a first payload size when a list of previously authenticated devices has at least one unfilled entry, wherein:
         the one or more first invitation messages comprise a generic address profile (GAP) address of the analyte sensor system; and
         the one or more first invitation messages have one or more invitation data structures;
      transmit one or more second invitation messages having a second payload size, smaller than the first payload size, when the list includes at least one device; and
      establish a communication session between the analyte sensor system and a display device, based on at least one of the first invitation messages or the second invitation messages; and the display device is configured to:
receive at least one of the one or more first invitation messages having the first payload size or the one or more second invitation messages having the second payload size; and
establish the communication session between the analyte sensor system and the display device, based on at least one of the first invitation messages or the second invitation messages.

15. An analyte monitoring system, comprising:
a display device; and
an analyte sensor system, wherein:
the analyte sensor system is configured to:
transmit one or more first invitation messages having a first payload size when a list of previously authenticated devices has at least one unfilled entry;
transmit one or more second invitation messages having a second payload size, smaller than the first payload size, when the list includes at least one device, wherein the one or more second invitation messages only include a generic address profile (GAP) address of the analyte sensor system; and
establish a communication session between the analyte sensor system and a display device, based on at least one of the first invitation messages or the second invitation messages; and
the display device is configured to:
receive at least one of the one or more first invitation messages having the first payload size or the one or more second invitation messages having the second payload size; and
establish the communication session between the analyte sensor system and the display device, based on at least one of the first invitation messages or the second invitation messages.

\* \* \* \* \*